United States Patent
Chipchase et al.

(10) Patent No.: US 9,262,120 B2
(45) Date of Patent: Feb. 16, 2016

(54) AUDIO SERVICE GRAPHICAL USER INTERFACE

(75) Inventors: Jan Chipchase, Los Angeles, CA (US); Pascal Wever, Los Angeles, CA (US); Nikolaj Bestle, Calabasas, CA (US); Pawena Thimaporn, Woodland Hills, CA (US); Thomas Arbisi, Camarillo, CA (US); John-Rhys Newman, Woodland Hills, CA (US); Andrew Gartrell, Tarzana, CA (US); Simon James, Simi Valley, CA (US); Carrie Chan, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 824 days.

(21) Appl. No.: 12/558,273

(22) Filed: Sep. 11, 2009

(65) Prior Publication Data
US 2011/0066941 A1 Mar. 17, 2011

(51) Int. Cl.
*G06F 3/048* (2013.01)
*G06F 3/16* (2006.01)

(52) U.S. Cl.
CPC ...................................... *G06F 3/167* (2013.01)

(58) Field of Classification Search
CPC .......... G06F 17/3005; G06F 17/30056; G06F 17/30; G06F 17/36; G06F 17/30017; G06F 3/048
USPC .......................................... 715/716, 727, 738
See application file for complete search history.

(56) References Cited

U.S. PATENT DOCUMENTS

| | | | |
|---|---|---|---|
| 6,661,877 B1 * | 12/2003 | Lee ..................... | H04L 12/5835 379/67.1 |
| 6,769,028 B1 * | 7/2004 | Sass ................... | H04L 29/12047 348/E7.071 |
| 7,139,553 B2 | 11/2006 | Alston | |
| 7,325,199 B1 | 1/2008 | Reid | |
| 7,434,155 B2 * | 10/2008 | Lee ....................... | G11B 27/034 348/423.1 |
| 7,450,931 B2 | 11/2008 | Alston | |
| 7,747,655 B2 * | 6/2010 | Hull et al. ....................... | 707/802 |
| 2002/0124097 A1 * | 9/2002 | Isely ....................... | H04H 60/95 709/231 |
| 2003/0009493 A1 * | 1/2003 | Parker ............... | G06F 17/30274 715/201 |
| 2003/0091069 A1 * | 5/2003 | Kraemer .................. | H04B 1/20 370/487 |
| 2003/0202008 A1 * | 10/2003 | McDonald et al. ........... | 345/736 |
| 2004/0003090 A1 * | 1/2004 | Deeds ................. | H04L 65/4076 709/227 |
| 2004/0199395 A1 * | 10/2004 | Schulz ................. | G11B 27/031 704/278 |
| 2004/0221311 A1 | 11/2004 | Dow et al. | |
| 2005/0010409 A1 * | 1/2005 | Hull ....................... | G06K 15/00 704/243 |
| 2005/0172001 A1 * | 8/2005 | Zaner .................... | H04L 12/581 709/205 |

(Continued)

OTHER PUBLICATIONS

IN-HEH Timeline 1.1.1. Accessed: Dec. 17, 2009, pp. 1-3, http://wareseeker.com/Home-Education/in-heh-timeline-1.1.1.zip/3b5157b275.

*Primary Examiner* — Daeho Song
(74) *Attorney, Agent, or Firm* — Ditthavong & Steiner, P.C.

(57) ABSTRACT

Techniques for providing a graphical user interface for an audio channel include receiving data that indicates multiple audio contents for audio presentation at a first node. A graphical user interface is formed, which displays a time sequence of the plurality of audio contents for presentation, and which associates with each audio content one or more selectable operations on the audio content. Presentation of the graphical user interface is caused at a second node. In response to causing presentation of the graphical user interface, data is received that indicates an associated operation on audio content based on input from the second node.

20 Claims, 19 Drawing Sheets

(56) References Cited

U.S. PATENT DOCUMENTS

| | | | |
|---|---|---|---|
| 2005/0198031 A1* | 9/2005 | Pezaris | H04L 12/588 |
| 2005/0216838 A1* | 9/2005 | Graham | G06F 3/1206 |
| | | | 715/713 |
| 2005/0266884 A1* | 12/2005 | Marriott | H04L 12/5835 |
| | | | 455/558 |
| 2005/0286546 A1* | 12/2005 | Bassoli | G11B 27/002 |
| | | | 370/432 |
| 2006/0035206 A1* | 2/2006 | Clark et al. | G06Q 10/0639 |
| | | | 434/350 |
| 2006/0199567 A1 | 9/2006 | Alston | |
| 2006/0242303 A1* | 10/2006 | Petrack | H04L 12/1822 |
| | | | 709/227 |
| 2007/0050501 A1 | 3/2007 | Alston | |
| 2007/0070066 A1 | 3/2007 | Bakhash | |
| 2007/0118801 A1* | 5/2007 | Harshbarger et al. | G11B 27/031 |
| | | | 715/730 |
| 2007/0220092 A1* | 9/2007 | Heitzeberg et al. | H04L 12/1818 |
| | | | 709/204 |
| 2008/0043943 A1* | 2/2008 | Sipher et al. | G06Q 10/107 |
| | | | 379/88.22 |
| 2008/0195956 A1* | 8/2008 | Baron et al. | G06Q 30/02 |
| | | | 715/753 |
| 2008/0235248 A1* | 9/2008 | Krantz et al. | G06F 3/033 |
| 2008/0235590 A1* | 9/2008 | Krantz et al. | G06F 3/033 |
| | | | 715/730 |
| 2008/0235591 A1* | 9/2008 | Krantz et al. | G06F 3/033 |
| | | | 715/730 |
| 2008/0294663 A1* | 11/2008 | Heinley et al. | 707/100 |
| 2008/0299960 A1* | 12/2008 | Lockhart et al. | G06Q 10/109 |
| | | | 455/418 |
| 2009/0044122 A1 | 2/2009 | Evans et al. | |
| 2009/0150147 A1* | 6/2009 | Jacoby et al. | G06F 17/30265 |
| | | | 704/235 |
| 2009/0164301 A1* | 6/2009 | O'Sullivan | G06Q 30/02 |
| | | | 705/14.49 |
| 2009/0164902 A1* | 6/2009 | Cohen et al. | G10H 1/0025 |
| | | | 715/716 |
| 2009/0216806 A1* | 8/2009 | Feuerstein | G06F 17/30994 |
| 2009/0292731 A1* | 11/2009 | Park | G06F 17/30056 |
| 2010/0122174 A1* | 5/2010 | Snibbe | G06Q 10/10 |
| | | | 715/733 |
| 2010/0131613 A1* | 5/2010 | Jonsson | H04L 12/281 |
| | | | 709/218 |
| 2010/0158471 A1* | 6/2010 | Ogikubo | G06F 3/04845 |
| | | | 386/278 |
| 2010/0235443 A1* | 9/2010 | Laiho | G06Q 30/02 |
| | | | 709/204 |
| 2010/0323669 A1* | 12/2010 | Maggenti | H04M 3/42221 |
| | | | 455/413 |
| 2011/0004519 A1* | 1/2011 | Aleong | G06Q 10/10 |
| | | | 705/14.53 |
| 2011/0041059 A1* | 2/2011 | Amarasingham | G11B 27/034 |
| | | | 715/716 |

* cited by examiner

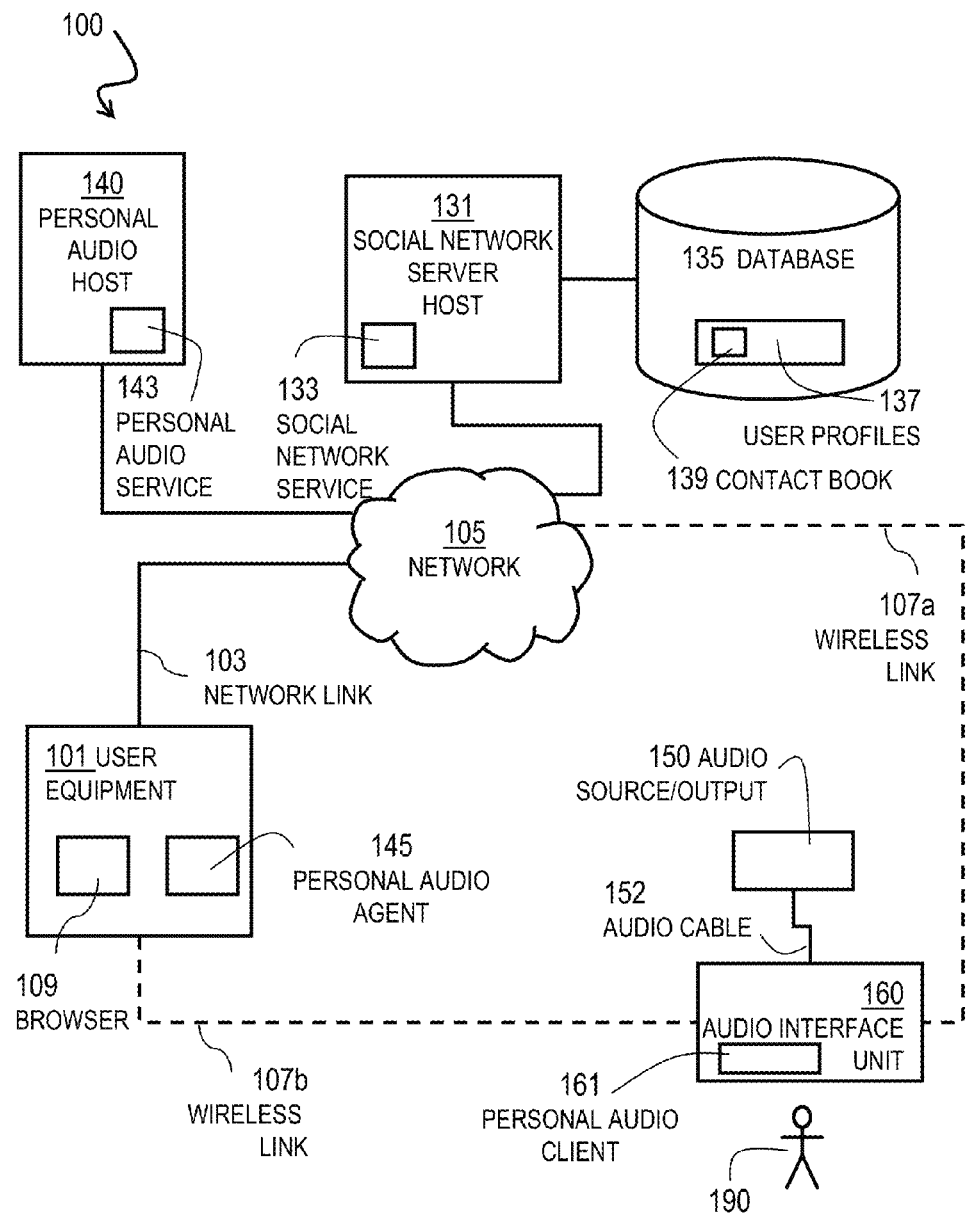

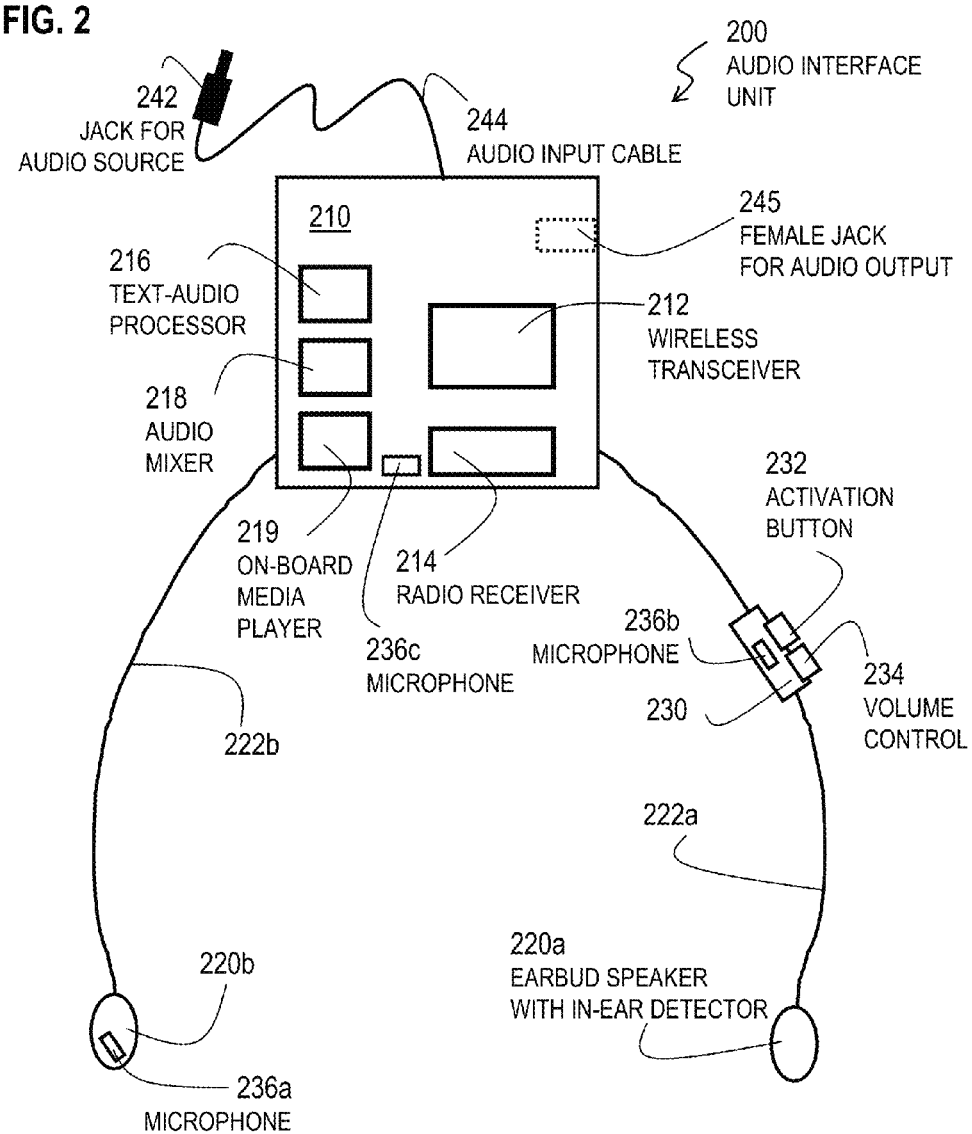

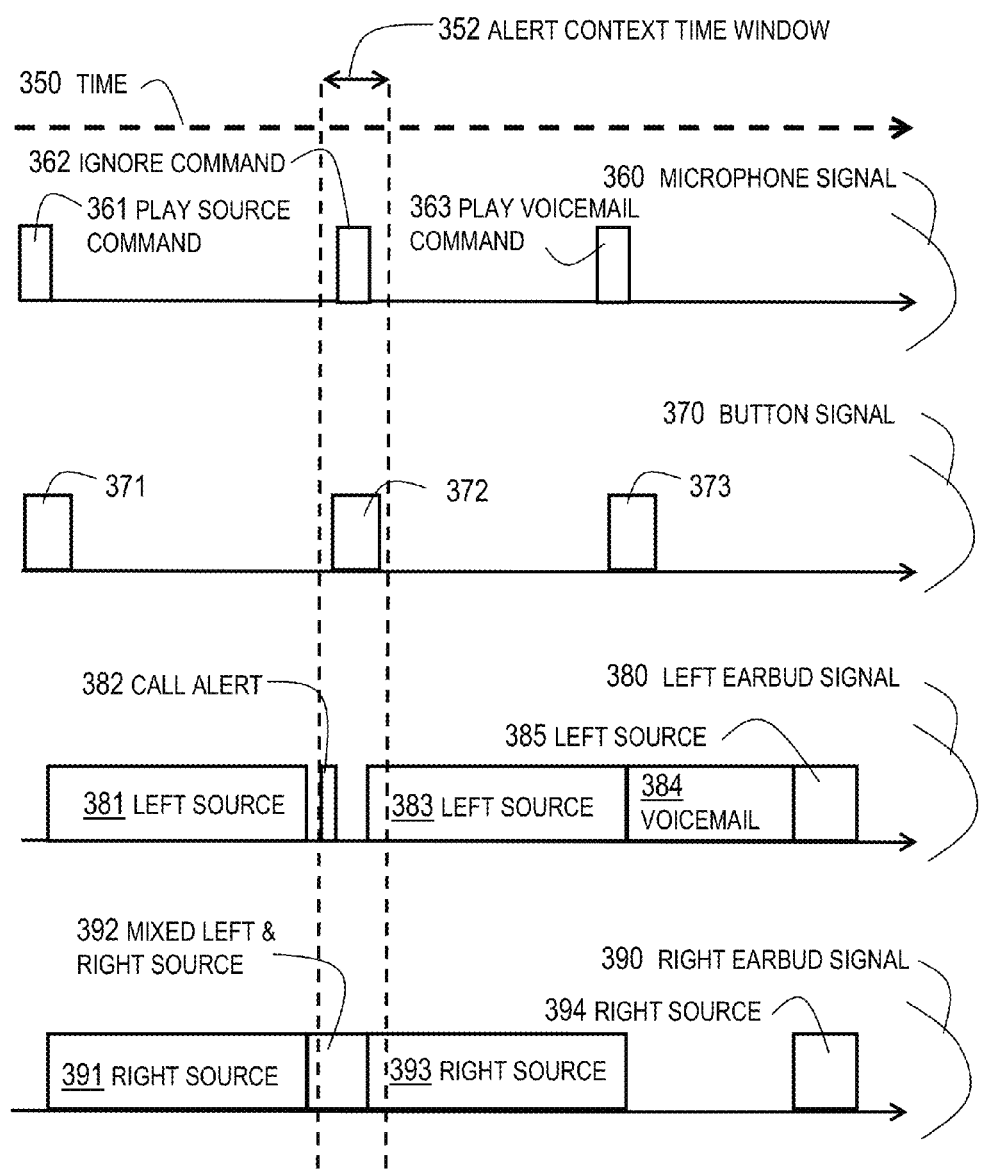

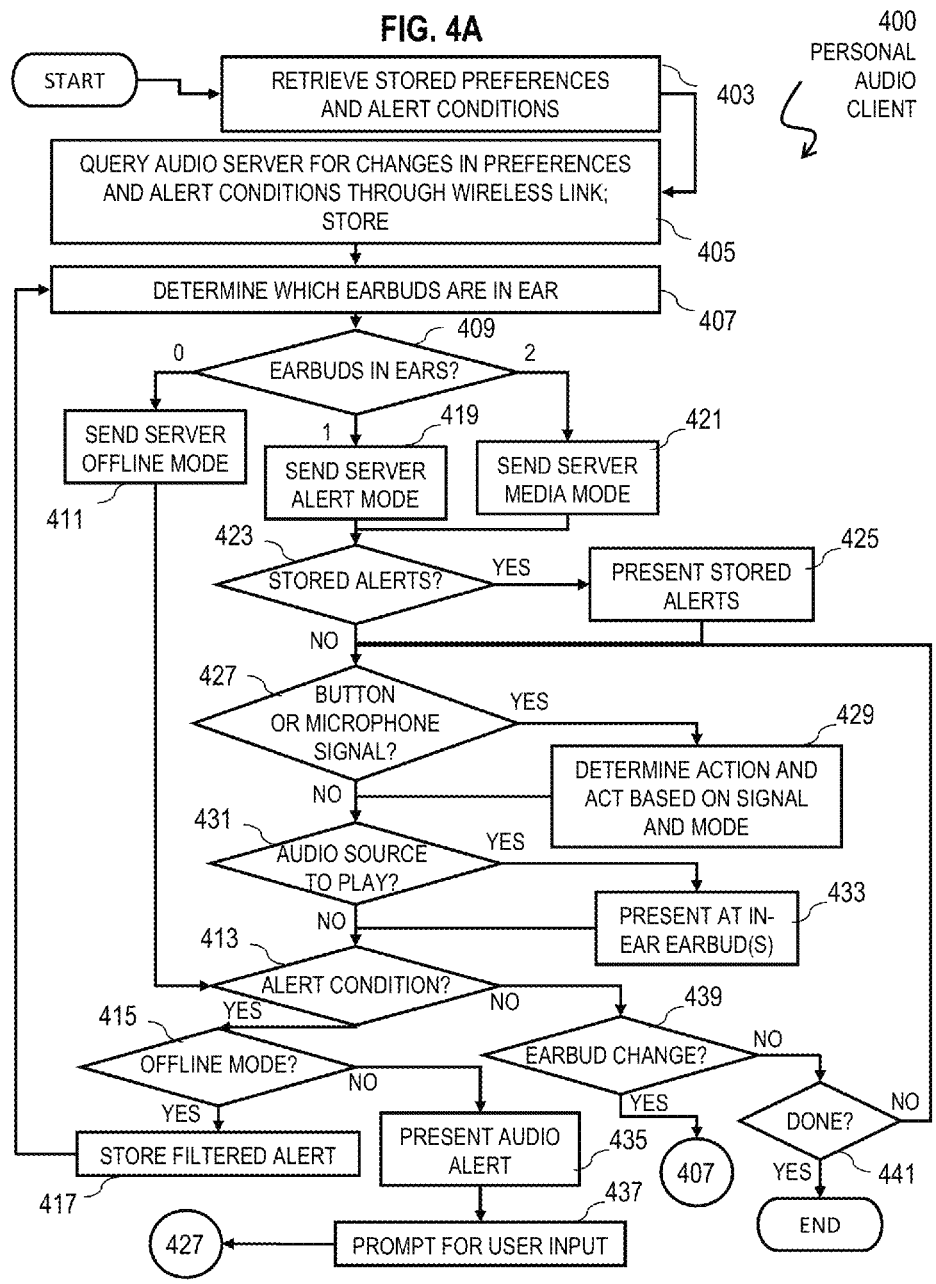

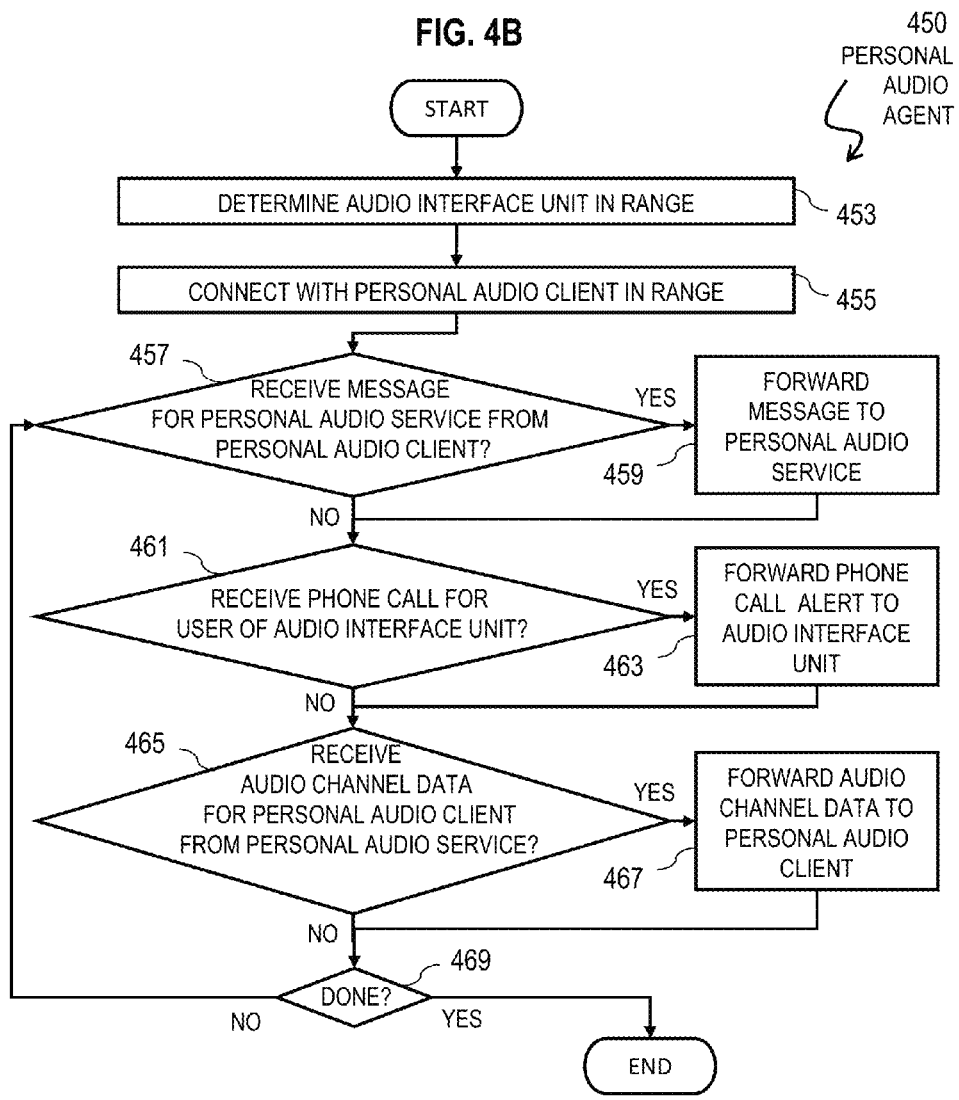

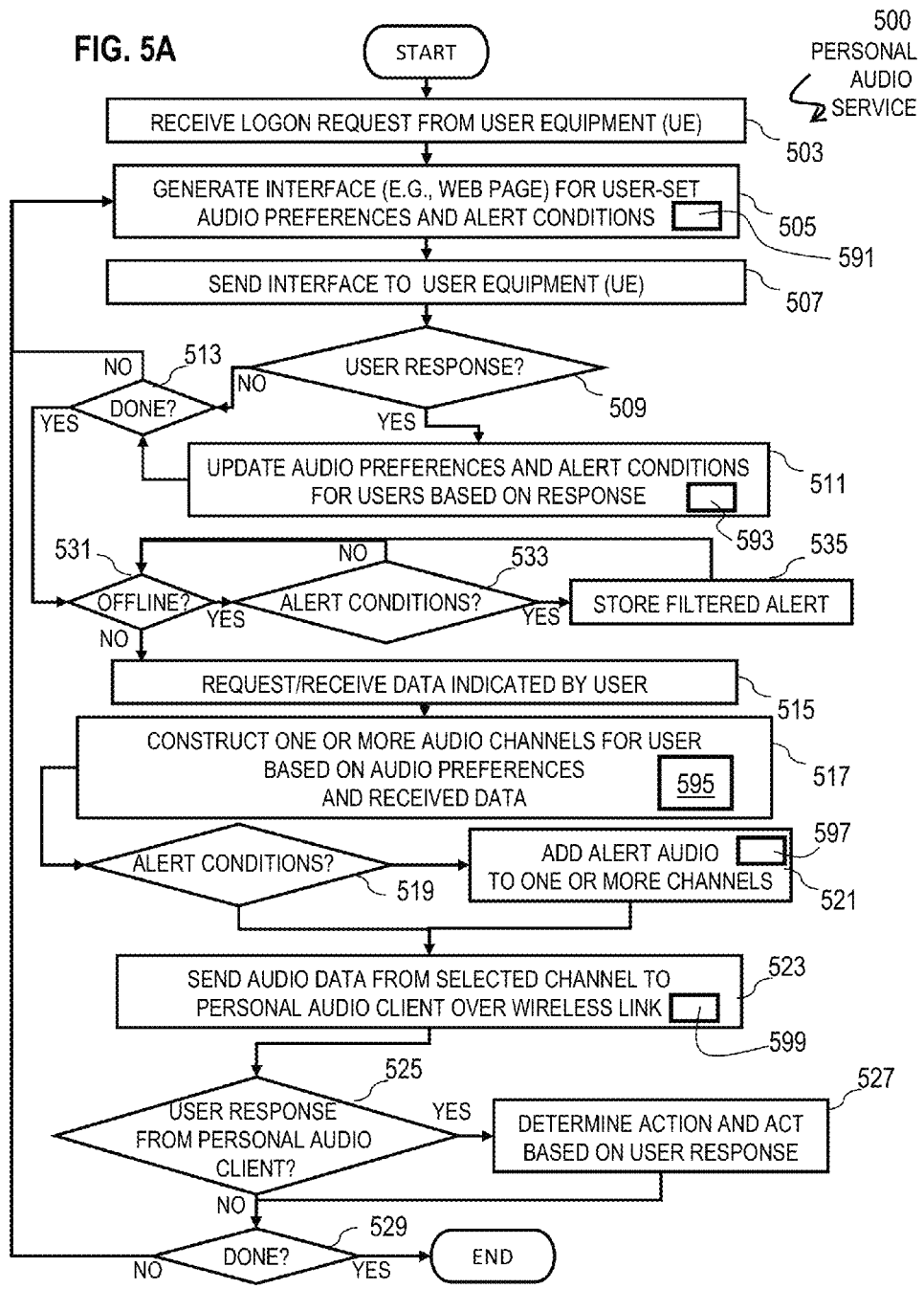

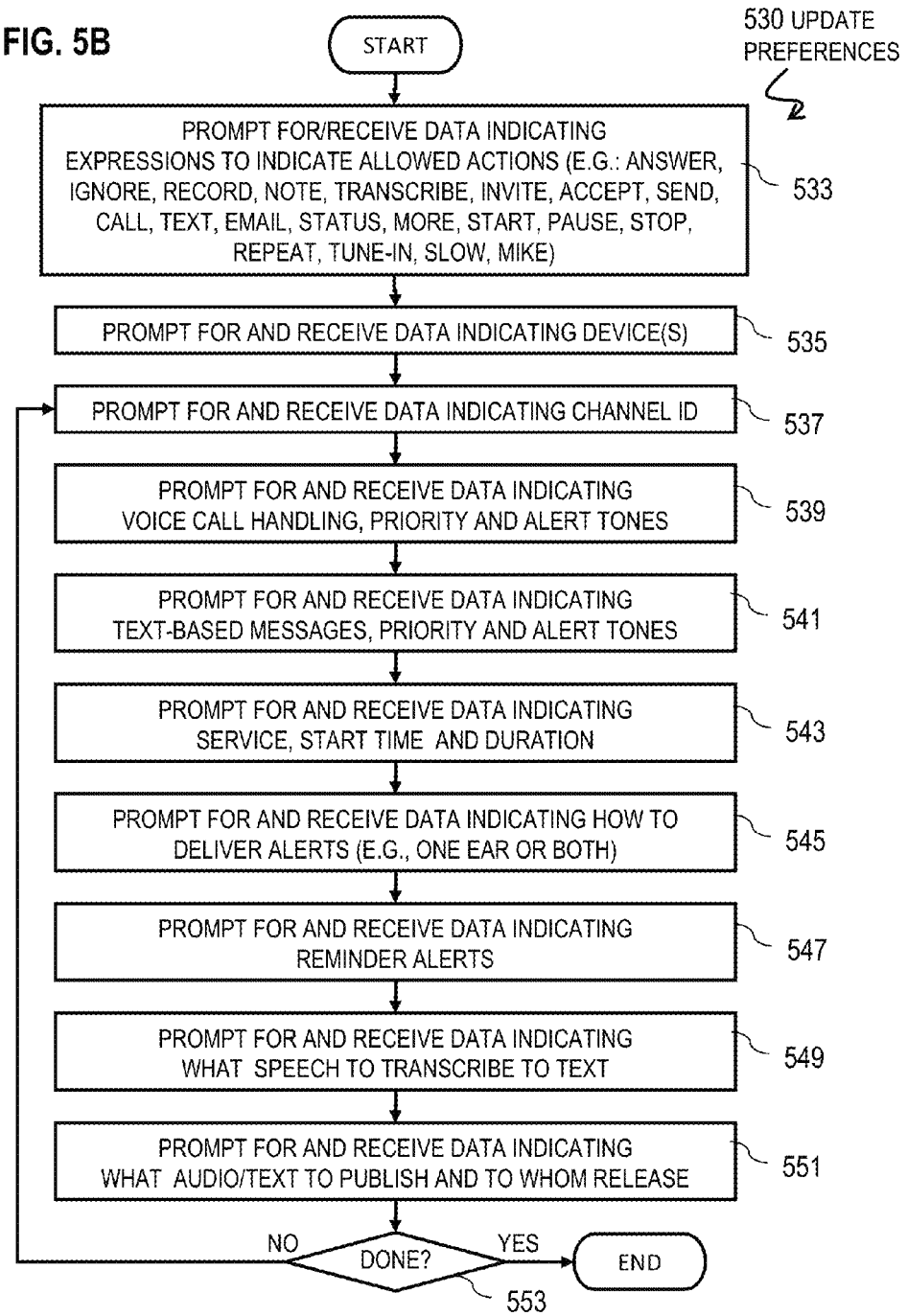

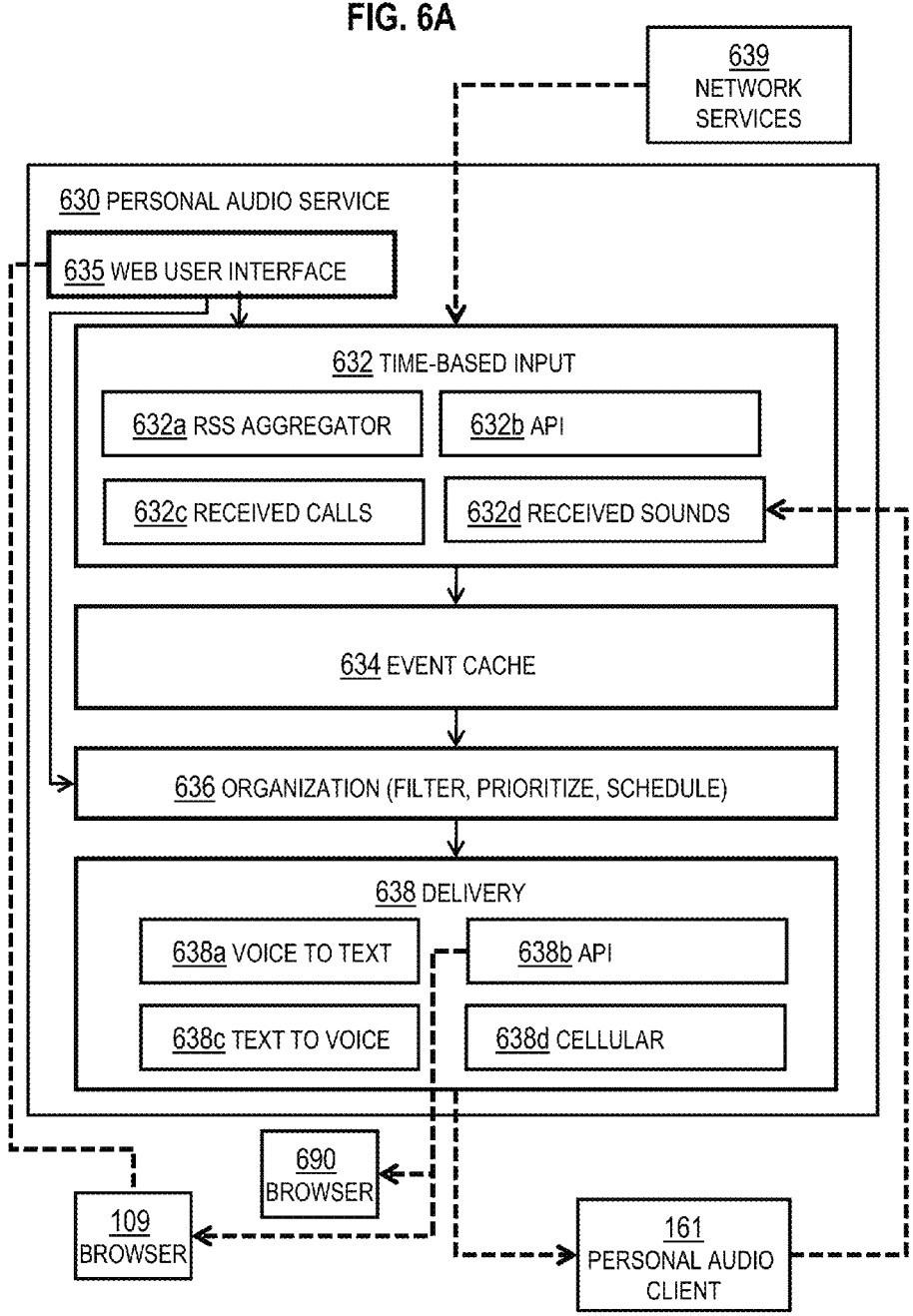

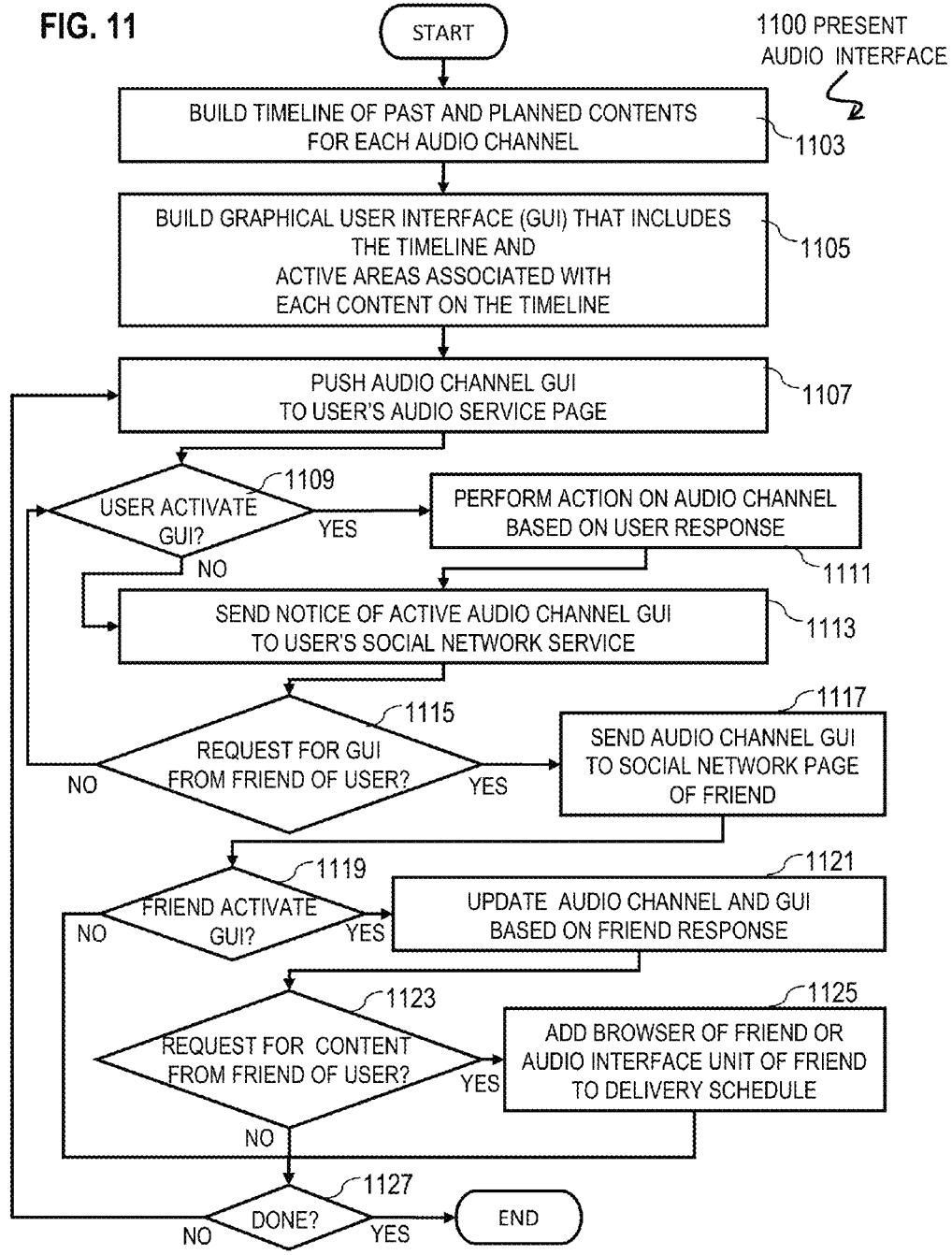

AUDIO SERVICE GRAPHICAL USER INTERFACE

BACKGROUND

Network service providers and device manufacturers are continually challenged to deliver value and convenience to consumers by, for example, providing compelling network services and devices for wireless links such as cellular transmissions. Most services involve the customer/user interacting with a device that has a visual display and a pad of multiple software or hardware keys to press, or both. By their nature, these devices require the user's eyes gaze on the device, at least for a short time, and one or more of the user's hands press the appropriate hard or soft keys. This can divert the user from other actions the user may be performing, such as operating equipment, driving, cooking, administering care to one or more persons, among thousands of other daily tasks.

SOME EXAMPLE EMBODIMENTS

Therefore, there is a need for delivering network services through an audio interface unit with little or no involvement of the user's eyes and hands; and it is desirable both to easily control the audio interface and share the audio interface with other users of a social network According to one embodiment, a method comprises causing at least in part a receiving of data that indicates one or more audio contents for audio presentation at a first node. A graphical user interface is caused at least in part to be formed, which displays a time sequence of the audio contents for presentation at the first node, and which associates with each audio content one or more selectable operations on the audio content. Presentation is initiated of the graphical user interface at a second node. In response to causing the presentation of the graphical user interface, data is received that indicates an associated operation on audio content based on input from the second node.

According to another embodiment, a computer-readable storage medium carrying one or more sequences of one or more instructions which, when executed by one or more processors, cause an apparatus, at least in part, to receive data that indicates one or more audio contents for audio presentation at a first node. The apparatus is further caused, at least in part, to form a graphical user interface. The graphical user interface displays a time sequence of the audio contents for presentation, and associates with each audio content one or more selectable operations on the audio content. The apparatus is further caused, at least in part, to present the graphical user interface at a second node. In response to causing the presentation of the graphical user interface, the apparatus is caused to receive data that indicates an associated operation on audio content based on input from the second node.

According to another embodiment, an apparatus comprises means for receiving data that indicates one or more audio contents for audio presentation at a first node. The apparatus also comprises means for forming a graphical user interface. The graphical user interface displays a time sequence of the audio contents for presentation, and associates with each audio content one or more selectable operations on the audio content. The apparatus also includes means for causing presentation of the graphical user interface at a second node. The apparatus includes means for receiving data that indicates an associated operation on audio content based on input from the second node, in response to causing presentation of the graphical user interface.

According to another embodiment, a method comprises facilitating access to, including granting access rights for, a user interface configured to receive data that indicates one or more audio contents for audio presentation at a first node. The method further comprises facilitating access to, including granting access rights for, a graphical user interface that displays a time sequence of the audio contents for presentation, and associates with each audio content one or more selectable operations on the audio content.

According to another embodiment, an apparatus includes at least one processor and at least one memory including computer instructions. The at least one memory and computer instructions are configured to, with the at least one processor, cause the apparatus at least to cause receiving of data that indicates one or more audio contents for audio presentation at a first node and cause forming of a graphical user interface. The graphical user interface displays a time sequence of the audio contents for presentation, and associates with each audio content one or more selectable operations on the audio content. The at least one memory and computer instructions are further configured to, with the at least one processor, cause the apparatus at least to cause presentation of the graphical user interface at a second node; and in response to causing the presentation of the graphical user interface, cause receiving of data that indicates an associated operation on audio content based on input from the second node.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of an example system capable of providing network services through an audio interface unit, according to one embodiment;

FIG. 2 is a diagram of the components of an example audio interface unit, according to one embodiment;

FIG. 3 is a time sequence diagram that illustrates example input and audio output signals at an audio interface unit, according to an embodiment;

FIG. 4A is a flowchart of an example process for providing network services at an audio interface unit, according to one embodiment;

FIG. 4B is a flowchart of an example process for providing network services at a personal audio agent in communication between a personal audio service and an audio interface unit, according to one embodiment;

FIG. 5A is a flowchart of an example process for providing network services at a personal audio service, according to one embodiment;

FIG. 5B is a flowchart of an example process for one step of the method of FIG. 5A, according to one embodiment;

FIG. 6A is a diagram of components of a personal audio service module, according to an embodiment;

FIG. 11 is a flowchart of an example process to provide a graphical user interface to control an audio channel, according to one embodiment;

DESCRIPTION OF SOME EMBODIMENTS

Figure 6B:
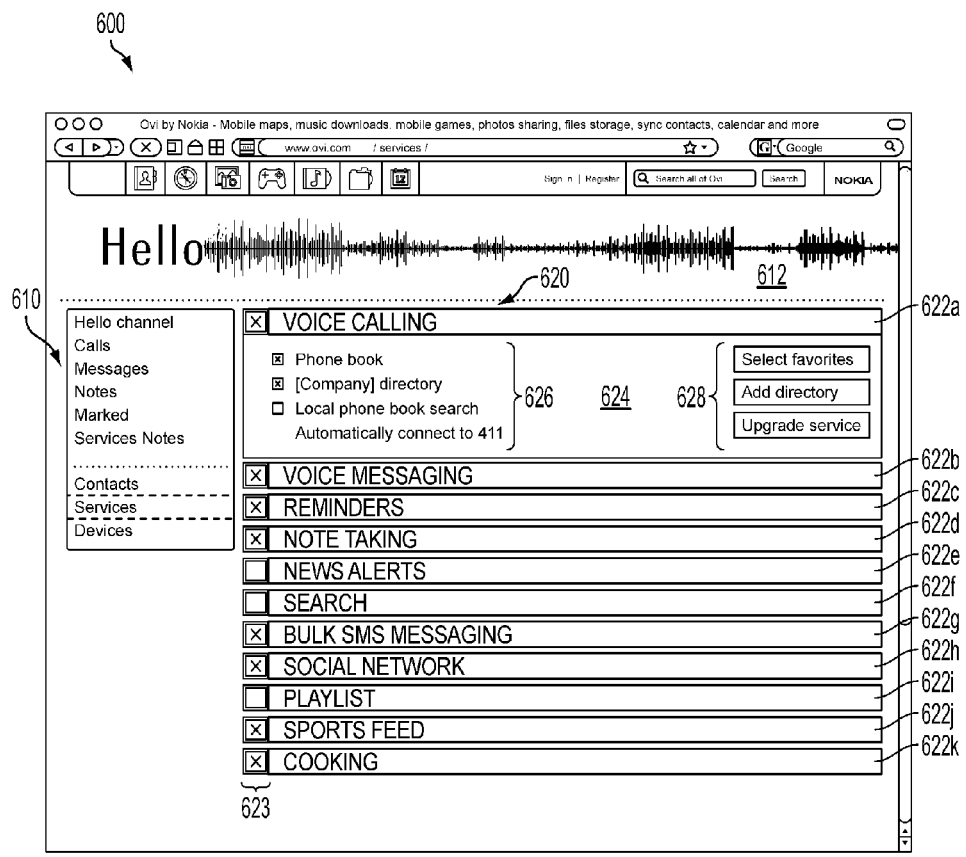
FIG. 6B is a diagram of an example user interface utilized in a portion of the process of FIG. 5A, according to an embodiment.

A method and apparatus for providing network services through an audio interface unit are disclosed. In the following description, for the purposes of explanation, numerous specific details are set forth in order to provide a thorough understanding of some embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to an audio interface unit with a full cellular communications engine and no keypad or visual display, it is contemplated that the approach described herein may be used with other wireless receivers and transceivers, including transceivers for Institute of Electrical & Electronics Engineers (IEEE) 802.11 standards for carrying out wireless local area network (WLAN) computer communication in the 2.4, 3.6 and 5 gigaHertz (GHz) frequency bands (1 GHz=$10^9$ cycles per second, also called Hertz), transceivers for IEEE 802.15 as a standardization of Bluetooth wireless specification for wireless personal area networks (WPAN), and receivers for radio signals, such as amplitude modulated (AM) signals and frequency modulated (FM) signals in various radio frequency bands, including broadcast radio bands, television audio bands, and satellite radio bands and in devices that include a keypad or a visual display or both.

FIG. 1 is a diagram of an example system 100 capable of providing network services through an audio interface unit, according to one embodiment. A typical network device, such as a cell phone, personal digital assistant (PDA), or laptop, demands a user's eyes or hands or both, and diverts the user from other actions the user may be performing, such as operating equipment, driving, cooking, administering care to one or more persons, or walking, among thousands of other actions associated with even routine daily tasks.

To address this problem, system 100 of FIG. 1 introduces the capability for a user 190 to interact with a network without involving cables or diverting the user's eyes or hands from other tasks. Although user 190 is depicted for purposes of illustration, user 190 is not part of system 100. The system 100 allows the user 190 to wear an unobtrusive audio interface unit 160 and interact with one or more network services (e.g., social network service 133) through one or more wireless links (e.g., wireless link 107a, and wirelesses link 107b, collectively referenced hereinafter as wireless links 107), by listening to audio as output of the system and speaking as input to the system. Listening and speaking to receive and give information is not only natural and easy, but also is usually performed hands free and eyes free. Thus, the user can enjoy one or more network services while still productively and safely performing other daily tasks. Because the connection to the network is wireless, the user is unconstrained by cables while performing these other tasks. In embodiments in which the audio interface unit is simple, it can be manufactured inexpensively and can be made to be unobtrusive. An unobtrusive audio interface unit can be worn constantly by a user (e.g., tucked in clothing), so that the user 190 is continually available via the audio interface unit 160. This enables the easy and rapid delivery of a wide array of network services, as described in more detail below.

As shown in FIG. 1, the system 100 comprises an audio interface unit 160 and user equipment (UE) 101, both having connectivity to a personal audio host 140 and thence to a network service, such as social network service 133, via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like. A network node (or simply "node") is any device that communicates with any other device in network 105.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

The audio interface unit 160 is a much trimmed down piece of user equipment with primarily audio input from, and audio output to, user 190. Example components of the audio interface unit 160 are described in more detail below with reference to FIG. 2. It is also contemplated that the audio interface unit 160 comprises "wearable" circuitry. In the illustrated embodiments, a portable audio source/output 150, such as a portable Moving Picture Experts Group Audio Layer 3 (MP3) player, as a local audio source is connected by audio cable 152 to the audio interface unit 160. In some embodiments, the audio source/output 150 is an audio output device, such as a set of one or more speakers in the user's home or car or other facility. In some embodiments, both an auxiliary audio input and auxiliary audio output are connected to audio interface unit 160 by two or more separate audio cables 152

By way of example, the UE 101 and audio interface unit 160 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Processes executing on various devices, such as audio interface unit 160 and personal audio host 140, often communicate using the client-server model of network communications. The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web (WWW) servers that provide web pages.

In the illustrated embodiment, the UE 101 includes a browser 109 for interacting with WWW servers included in the social network service module 133 on one or more social network server hosts 131 and other service modules on other hosts. The illustrated embodiment includes a personal audio service module 143 on personal audio host 140. The personal audio service module 143 includes a Web server for interacting with browser 109 and also an audio server for interacting with a personal audio client 161 executing on the audio interface unit 160. The personal audio service 143 is configured to deliver audio data to the audio interface unit 160. In some embodiments, at least some of the audio data is based on data provided by other servers on the network, such as social network service 133. In the illustrated embodiment, the personal audio service 143 is configured for a particular user 190 by Web pages delivered to browser 109, for example to specify a particular audio interface unit 160 and what services are to be delivered as audio data to that unit. After configuration, user 190 input is received at personal audio service 143 from personal audio client 161 based on spoken words of user 190, and selected network services content is delivered from the personal audio service 143 to user 190 through audio data sent to personal audio client 161.

Many services are available to the user 190 of audio interface unit 160 through the personal audio service 143 via network 105, including social network service 133 on one or more social network server hosts 131. In the illustrated embodiment, the social network service 133 has access to database 135 that includes one or more data structures, such as user profiles data structure 137 that includes a contact book data structure 139. Information about each user who subscribes to the social network service 133 is stored in the user profiles data structure 137, and the telephone number, cell phone, number, email address or other network addresses, or some combination, of one or more persons whom the user contacts are stored in the contact book data structure 139.

In some embodiments, the audio interface unit 160 connects directly to network 105 via wireless link 107a (e.g., via a cellular telephone engine or a WLAN interface to a network access point). Any telephone technology may be used, including standard definition (SD) and high definition (HD) audio over wired and wireless telephones. In some embodiments, the audio interface unit 160 connects to network 105 indirectly, through UE 101 (e.g., a cell phone or laptop computer) via wireless link 107b (e.g., a WPAN interface to a cell phone or laptop). Network link 103 may be a wired or wireless link, or some combination. In some embodiments in which audio interface unit relies on wireless link 107b, a personal audio agent process 145 executes on the UE 101 to transfer data packets between the audio interface unit 160 sent by personal audio client 161 and the personal audio service 143, and to convert other data received at UE 101 to audio data for presentation to user 190 by personal audio client 161.

Although various hosts and processes and data structures are depicted in FIG. 1 and arranged in a particular way for purposes of illustration, in other embodiments, more or fewer hosts, processes and data structures are involved, or one or more of them, or portions thereof, are arranged in a different way.

FIG. 2 is a diagram of the components of an example audio interface unit 200, according to one embodiment. Audio interface unit 200 is a particular embodiment of the audio interface unit 160 depicted in FIG. 1. By way of example, the audio interface unit 200 includes one or more components for providing network services using audio input from and audio output to a user. It is contemplated that the functions of these components may be combined in one or more components, such as one or more chip sets depicted below and described with reference to FIG. 9, or performed by other components of equivalent functionality. In some embodiments, one or more of these components, or portions thereof, are omitted, or one or more additional components are included, or some combination of these changes is made.

In the illustrated embodiment, the audio interface unit 200 includes circuitry housing 210, stereo headset cables 222a and 222b (collectively referenced hereinafter as stereo cables 222), stereo speakers 220a and 220b configured to be worn in the ear of the user with in-ear detector (collectively referenced hereinafter as stereo earbud speakers 220), controller 230, and audio input cable 244.

In the illustrated embodiment, the stereo earbuds 220 include in-ear detectors that can detect whether the earbuds are positioned within an ear of a user. Any in-ear detectors known in the art may be used, including detectors based on motion sensors, heart-pulse sensors, light sensors, or temperature sensors, or some combination, among others. In some embodiments the earbuds do not include in-ear detectors. In some embodiments, one or both earbuds 220 include a microphone, such as microphone 236a, to pick up spoken sounds from the user. In some embodiments, stereo cables 222 and earbuds 220 are replaced by a single cable and earbud for a monaural audio interface.

The controller 230 includes an activation button 232 and a volume control element 234. In some embodiments, the controller 230 includes a microphone 236b instead of or in addition to the microphone 236a in one or more earbuds 220 or microphone 236c in circuitry housing 210. In some embodiments, the controller 230 is integrated with the circuitry housing 210.

The activation button 232 is depressed by the user when the user wants sounds made by the user to be processed by the audio interface unit 200. Depressing the activation button to speak is effectively the same as turning the microphone on, wherever the microphone is located. In some embodiments, the button is depressed for the entire time the user wants the user's sounds to be processed; and is released when processing of those sounds is to cease. In some embodiments, the activation button 232 is depressed once to activate the microphone and a second time to turn it off. Some audio feedback is used in some of these embodiments to allow the user to know which action resulted from depressing the activation button 232.

In some embodiment with an in-ear detector and a microphone 236a in the earbud 220b, the activation button 232 is omitted and the microphone is activated when the earbud is out and the sound level at the microphone 236a in the earbud 220b is above some threshold that is easily obtained when held to the user's lips while the user is speaking and which rules out background noise in the vicinity of the user.

An advantage of having the user depress the activation button 232 or take the earbud with microphone 236a out and hold that earbud near the user's mouth is that persons in sight of the user are notified that the user is busy speaking and, thus, is not to be disturbed.

In some embodiments, the user does not need to depress the activation button 232 or hold an earbud with microphone 236a; instead the microphone is always active but ignores all sounds until the user speaks a particular word or phrase, such as "Mike On," that indicates the following sounds are to be processed by the unit 200, and speaks a different word or phrase, such as "Mike Off," that indicates the following sounds are not to be processed by the unit 200. Some audio feedback is available to determine if the microphone is being processed or not, such as responding to a spoken word or phrase, such as "Mike," with the current state "Mike on" or "Mike off." An advantage of the spoken activation of the microphone is that the unit 200 can be operated completely hands-free so as not to interfere with any other task the user might be performing.

In some embodiments, the activation button doubles as a power-on/power-off switch, e.g., as indicated by a single depression to turn the unit on when the unit is off and by a quick succession of multiple depressions to turn off a unit that is on. In some embodiments, a separate power-on/power-off button (not shown) is included, e.g., on circuitry housing 210.

The volume control 234 is a toggle button or wheel used to increase or decrease the volume of sound in the earbuds 220. Any volume control known in the art may be used. In some embodiments the volume is controlled by the spoken word, while the sounds from the microphone are being processed, such as "Volume up" and "Volume down" and the volume control 234 is omitted. However, since volume of earbud speakers is changed infrequently, using a volume control 234 on occasion usually does not interfere with hands-free operation while performing another task.

The circuitry housing 210 includes wireless transceiver 212, a radio receiver 214, a text-audio processor 216, an audio mixer module 218, and an on-board media player 219. In some embodiments, the circuitry housing 210 includes a microphone 236c.

The wireless transceiver 212 is any combined electromagnetic (em) wave transmitter and receiver known in the art that can be used to communicate with a network, such as network 105. An example transceiver includes multiple components of the mobile terminal depicted in FIG. 10 and described in more detail below with reference to that figure. In some embodiments, the audio interface unit 160 is passive when in wireless mode, and only a wireless receiver is included.

In some embodiments, wireless transceiver 212 is a full cellular engine as used to communicate with cellular base stations miles away. In some embodiments, wireless transceiver 212 is a WLAN interface for communicating with a network access point (e.g., "hot spot") hundreds of feet away. In some embodiments, wireless transceiver 212 is a WPAN interface for communicating with a network device, such as a SD or HD audio cell phone or laptop computer, with a relatively short distance (e.g., a few feet away). In some embodiments, the wireless transceiver 212 includes multiple transceivers, such as several of those transceivers described above.

In the illustrated embodiment, the audio interface unit includes several components for providing audio content to be played in earbuds 220, including radio receiver 214, on-board media player 219, and audio input cable 244. The radio receiver 214 provides audio content from broadcast radio or television or police band or other bands, alone or in some combination. On-board media player 219, such as a player for data formatted according to Moving Picture Experts Group Audio Layer 3 (MP3), provides audio from data files stored in memory (such as memory 905 on chipset 900 described below with reference to FIG. 9). These data files may be acquired from a remote source through a WPAN or WLAN or cellular interface in wireless transceiver 212. Audio input cable 244 includes audio jack 242 that can be connected to a local audio source, such as a separate local MP3 player. In such embodiments, the audio interface unit 200 is essentially a multi-functional headset for listening to the local audio source along with other functions. In some embodiments, the audio input cable 244 is omitted. In some embodiments, the circuitry housing 210 includes a female jack 245 into which is plugged a separate audio output device, such as a set of one or more speakers in the user's home or car or other facility.

In the illustrated embodiment, the circuitry housing 210 includes a text-audio processor 216 for converting text to audio (speech) or audio to text or both. Thus content delivered as text, such as via wireless transceiver 212, can be converted to audio for playing through earbuds 220. Similarly, the user's spoken words received from one or more microphones 236a, 236b, 236c (collectively referenced hereinafter as microphones 236) can be converted to text for transmission through wireless transceiver 212 to a network service. In some embodiments, the text-audio processor 216 is omitted and text-audio conversion is performed at a remote device and only audio data is exchanged through wireless transceiver 212. In some embodiments, the text-audio processor 216 is simplified for converting only a few key commands from speech to text or text to speech or both. By using a limited set of key commands of distinctly different sounds, a simple text-audio processor 216 can perform quickly with few errors and little power consumption.

In the illustrated embodiment, the circuitry housing 210 includes an audio mixer module 218, implemented in hardware or software, for directing audio from one or more sources to one or more earbuds 220. For example, in some embodiments, left and right stereo content are delivered to different earbuds when both are determined to be in the user's ears. However, if only one earbud is in an ear of the user, both left and right stereo content are delivered to the one earbud that is in the user's ear. Similarly, in some embodiments, when audio data is received through wireless transceiver 212 while local content is being played, the audio mixer module 218 causes the local content to be interrupted and the audio data from the wireless transceiver to be played instead. In some embodiments, if both earbuds are in place in the user's ears, the local content is mixed into one earbud and the audio data from the wireless transceiver 212 is output to the other earbud. In some embodiments, the selection to interrupt or mix the audio sources is based on spoken words of the user or preferences set when the audio interface unit is configured, as described in more detail below.

FIG. 3 is a time sequence diagram that illustrates example input and audio output signals at an audio interface unit, according to an embodiment. Specifically, FIG. 3 represents an example user experience for a user of the audio interface unit 160. Time increases to the right for an example time interval as indicated by dashed arrow 350. Contemporaneous signals at various components of the audio interface unit are displaced vertically and represented on four time lines depicted as four corresponding solid arrows below arrow 350. An asserted signal is represented by a rectangle above the corresponding time line; the position and length of the rectangle indicates the time and duration, respectively, of an asserted signal. Depicted are microphone signal 360, activation button signal 370, left earbud signal 380, and right earbud signal 390.

For purposes of illustration, it is assumed that the microphone is activated by depressing the activation button 232 while the unit is to process the incoming sounds; and the activation button is released when sounds picked up by the microphone are not to be processed. It is further assumed for purposes of illustration that both earbuds are in place in the corresponding ears of the user. It is further assumed for purposes of illustration that the user had previously subscribed, using browser 109 on UE 101 to interact with the personal audio service 143, for telephone call forwarding to the audio interface unit 160 and internet newsfeed to the unit 160.

At the beginning of the interval, the microphone is activated as indicated by the button signal portion 371, and the user speaks a command picked up as microphone signal portion 361 that indicates to play an audio source, e.g., "play FM radio," or "play local source," or "play stored track X" (where X is a number or name identifier for the local audio file of interest), or "play internet newsfeed." For purposes of illustration, it is assumed that the user has asked to play a stereo source, such as stored track X.

In response to the spoken command in microphone signal 361, the audio interface unit 160 outputs the stereo source to the two earbuds as left earbud signal 381 and right earbud signal 391 that cause left and right earbuds to play left source and right source respectively.

When a SD or HD audio telephone call is received (e.g., is forwarded from a cell phone or land line to the personal audio service 143) for the user, an alert sound is issued at the audio interface unit 160, e.g., as left earbud signal portion 382 indicating a telephone call alert. For example, in various embodiments, the personal audio service 143 receives the call and encodes an alert sound in one or more data packets and sends the data packets to personal audio client 161 through wireless link 107a or indirectly through personal audio agent 145 over wireless link 107b. The client 161 causes the alert to be mixed in to the left or right earbud signals, or both. In some embodiments, personal audio service 143 just sends data indicating an incoming call; and the personal audio client 161 causes the audio interface unit 160 to generate the alert sound internally as call alert signal portion 382. In some embodiments, the stereo source is interrupted by the audio mixer module 218 so that the alert signal portion 382 can be easily noticed by the user. In the illustrated embodiment, the audio mixer module 218 is configured to mix the left and right source and continue to present them in the right earbud as right earbud signal portion 392, while the call alert signal in left earbud signal portion 382 is presented alone to the left earbud. This way, the user's enjoyment of the stereo source is less interrupted, in case the user prefers the source to the telephone call.

The call alert left ear signal portion 382 initiates an alert context time window of opportunity indicated by time interval 352 in which microphone signals (or activation button signals) are interpreted in the context of the call alert. Only sounds that are associated with actions appropriate for responding to a call alert are tested for by the audio-text processor 216 or the remote personal audio service 143, such as "answer," "ignore," "identify." Having this limited context-sensitive vocabulary greatly simplifies the processing, thus reducing computational resource demands on the audio interface unit 200 or remote host 140, or both, and reducing error rates. In some embodiments, the activation button signal can be used, without the microphone signal, to represent one of the responses, indicated for example by the number or duration of depressions of the button, or by timing a depression during or shortly after a prompt is presented as voice in the earbuds). In some of these embodiments, no speech input is required to use the audio interface unit.

In the illustrated embodiment, the user responds by activating the microphone as indicated by activation button signal portion 372 and speaks a command to ignore the call, represented as microphone signal portion 362 indicating an ignore command. As a result, the call is not put through to the audio interface unit 160. It is assumed for purposes of illustration that the caller leaves a message with the user's voice mail system. Also as a result of the ignore command, the response to the call alert is concluded and the left and right sources for the stereo source are returned to the corresponding earbuds, as left earbud signal portion 383 and right earbud signal portion 393, respectively.

At a later time, the user decides to listen to the user's voicemail. The user activates the microphone as indicated by activation button signal portion 373 and speaks a command to play voicemail, represented as microphone signal portion 363 indicating a play voicemail command. As a result, audio data representing the user's voicemail is forwarded to the audio interface unit. In some embodiments, the text-audio processor 216 interprets the microphone signal portion 363 as the play voicemail command and sends a message to the personal audio service 143 to provide the voicemail data. In other embodiments, the microphone signal portion 363 is simply encoded as data, placed in one or more data packets, and forwarded to the personal audio service 143 that does the interpretation.

In either case, audio data is received from the voicemail system through the personal audio service 143 at the personal audio client 161 as data packets of encoded audio data, as a result of the microphone signal portion 363 indicating the play voicemail command spoken by the user. The audio mixer module 218 causes the audio represented by the audio data to be presented in one or more earbuds. In the illustrated embodiment, the voicemail audio signal is presented as left earbud signal portion 384 indicating the voicemail audio and the right earbud signal is interrupted. In some embodiments, the stereo source is paused (i.e., time shifted) until the voicemail audio is completed. In some embodiments, the stereo source that would have been played in this interval is simply lost.

When the voicemail signal is complete, the audio mixer module 218 restarts the left and right sources of the stereo source as left earbud signal portion 385 and right earbud signal portion 394, respectively.

Thus, as depicted in FIG. 3, a variety of network services, such as media playing, internet newsfeeds, SD or HD audio telephone calls and voicemail are delivered to a user through the unobtrusive, frequently worn, audio interface unit 200. In other embodiments, other alerts and audio sources are involved. Other audio sources include internet newsfeeds (including sports or entertainment news), web content (often converted from text to speech), streaming audio, broadcast radio, and custom audio channels designed by one or more users, among others. Other alerts include breaking news alerts, text and voice message arrival, social network status change, and user-set alarms and appointment reminders, among others.

Figure 8:
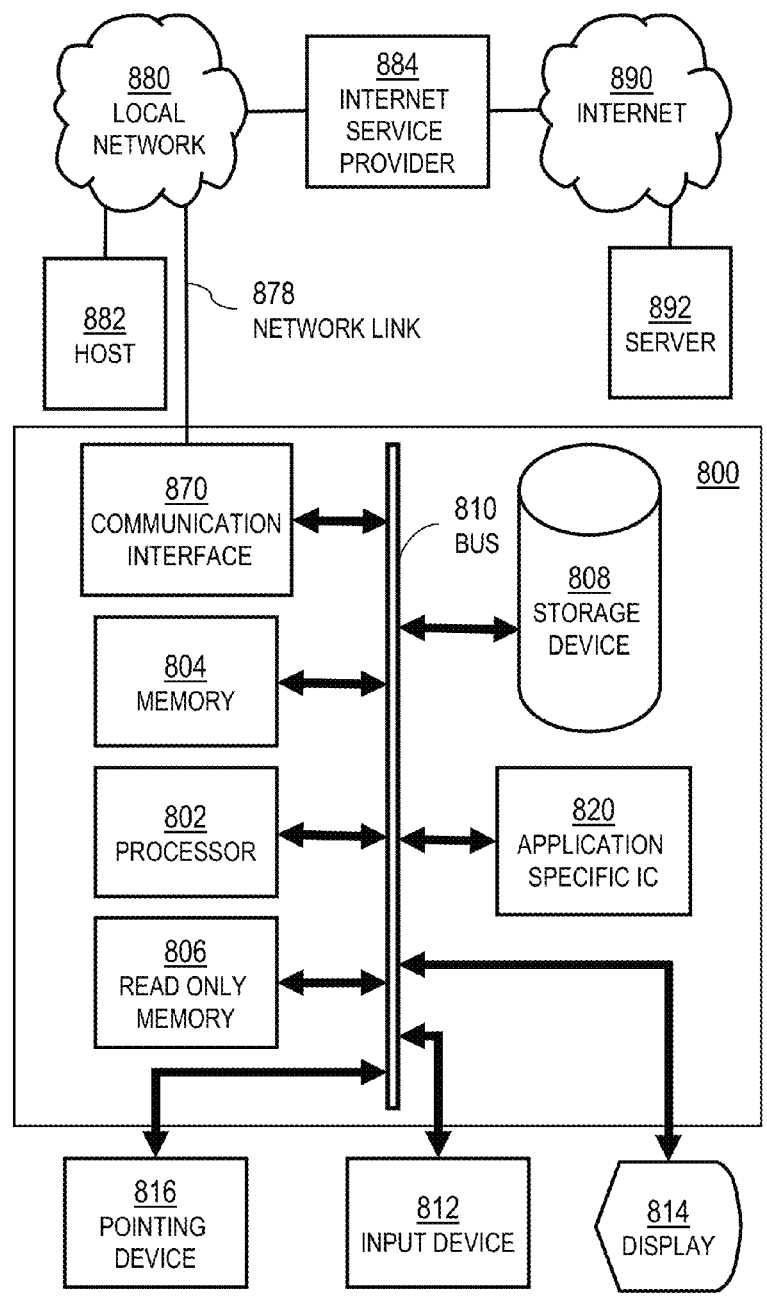
FIG. 8 is a diagram of hardware that can be used to implement an embodiment of the invention.
Figure 9:
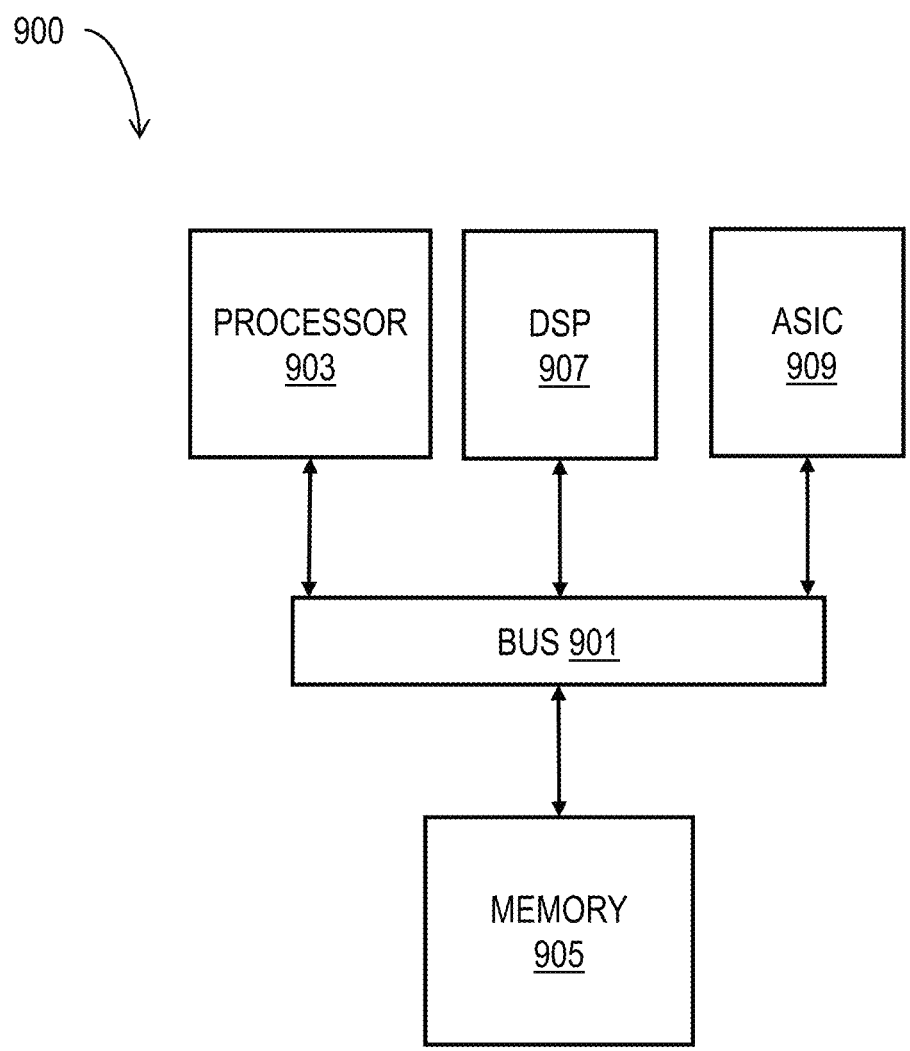
FIG. 9 is a diagram of a chip set that can be used to implement an embodiment of the invention.

In some embodiments, the audio interface unit includes a data communications bus, such as bus 901 of chipset 900 as depicted in FIG. 9, and a processor, such as processor 903 in chipset 900, or other logic encoded in tangible media as described with reference to FIG. 8. The tangible media is configured either in hardware or with software instructions in memory, such as memory 905 on chipset 900, to determine, based on spoken sounds of a user of the apparatus received at a microphone in communication with the tangible media through the data communications bus, whether to present audio data received from a different apparatus. The processor is also configured to initiate presentation of the received audio data at a speaker in communication with the tangible media through the data communications bus, if it is determined to present the received audio data.

FIG. 4A is a flowchart of an example process 400 for providing network services at an audio interface unit, according to one embodiment. In one embodiment, the personal audio client 161 on the audio interface unit 160 performs the process 400 and is implemented in, for instance, a chip set including a processor and a memory as shown FIG. 9 or logic encoded in tangible media. In some embodiments, the steps of FIG. 4 are represented as a state machine and implemented in whole or in part in hardware. Although steps in FIG. 4 and subsequent flow charts FIG. 4B, FIG. 5A, FIG. 5B, FIG. 7 and FIG. 11 are shown in a particular order for purposes of illustration, in other embodiments, one or more steps may be performed in a different order or overlapping in time, in series or in parallel, or one or more steps may be omitted or added, or changed in some combination of ways.

In step 403, stored preferences and alert conditions are retrieved from persistent memory on the audio interface unit 160. Preferences include values for parameters that describe optional functionality for the unit 160, such as how to mix different simultaneous audio sources, which earbud to use for alerts when both are available, how to respond to one or more earbuds not in an ear, what words to use for different actions, what words to use in different alert contexts, what network address to use for the personal audio service 143, names for different audio sources, names for different contacts. Parameters for alert conditions indicate what sounds to use for breaking news, social network contact status changes, text message, SD or HD audio phone calls, voice messages, reminders, and different priorities for different alerts. In some embodiments, the audio interface unit 160 does not include persistent memory for these preferences and step 403 is omitted.

In step 405, a query message is sent to the personal audio service 143 for changes in preferences and alert conditions. In some embodiments, the audio interface unit 160 does not include persistent memory for these preferences and step 405 includes obtaining all current values for preferences and alert conditions.

In step 407, it is determined which earbuds are in place in the user's ears. For example, in-ear detectors are interrogated to determine if each earbud is in place in a user's ear.

In step 409 a branch point is reached based on the number of earbuds detected to be in place in a user's ear. If no earbud is in place in the user's ear, then the audio interface unit is in offline mode, and a message is sent to the personal audio service 143 that the particular audio interface unit 160 is in offline mode.

In step 413, it is determined if an alert conditions is satisfied, e.g., a breaking news alert is received at the audio interface unit 160. In some embodiments, the user initiates the alert, e.g., by stating the word "play," which is desirable to follow, in some embodiments, by some identifier for the content to be played. If so, then in step 415 it is determined whether the audio interface unit is in offline mode. If so, then in step 417 instead of presenting the alert at an earbud, the alert is filtered and, if the alert passes the filter, the filtered alert is stored. The stored alerts are presented to the user when the user next inserts an earbud, as describe below with reference to step 425. Alerts are filtered to remove alerts that are not meaningfully presented later, such as an alert that it is 5

PM or an alert that a particular expected event or broadcast program is starting. Control then passes back to step 407 to determine which earbuds are currently in an ear of the user. In some embodiments, alerts and other audio content are determined by the remote personal audio service 143; and step 413, step 415 and step 417 are omitted.

If it is determined in step 409 that one earbud is in place in the user's ear, then the audio interface unit is in alert mode, capable of receiving alerts; and a message is sent, in step 419, to the personal audio service 143 that the particular audio interface 160 unit is in alert mode.

If it is determined in step 409 that two earbuds are in place in the user's ears, then the audio interface unit is in media mode, capable of listening to stereo media or both media and alerts simultaneously; and a message is sent to the personal audio service 143 that the particular audio interface 160 unit is in media mode (step 421).

In step 423, it is determined whether there are stored alerts. If so, then in step 425 the stored alerts are presented in one or more earbuds in place in the user's ear. In some embodiments, alerts and other audio content are determined by the remote personal audio service 143; and step 423 and step 425 are omitted.

In step 427, it is determined whether there is an activation button or microphone signal or both. If so, then in step 429 an action to take is determined and the action is performed based on the signal and the alert or media mode of the audio interface unit. For example, a particular audio source is played, or a particular alert is responded to based on the spoken word of the user, or a phone call to a particular contact is initiated. In some embodiments, the action is determined at the text-audio processor 216, or performed by the audio interface unit 160, or both. In some embodiments the button or microphone signal is transmitted to the personal audio service 143, and the action is determined and performed there. In some embodiments the action is determined at the text-audio processor 216; and that action is indicated in data sent to the personal audio service 143, where the action is performed.

In step 431, it is determined whether there is an audio source to play, such as broadcast radio program, a local audio source, a stream of data packets with audio codec for SD or HD audio, e.g., from a news feed, or text to speech conversion of web page content. If so, then in step 433, the audio source is presented at one or more in-ear earbuds by the audio mixer module 218.

In step 413, as described above, it is determined whether alert conditions are satisfied, e.g., whether an alert is received from the personal audio service 143. If so, and if the audio interface unit 160 is not in offline mode as determined in step 415, then in step 435 an audio alert is presented in one or more in-ear earbuds. For example the audio mixer module 218 interrupts the audio source to present the alert in one or both in-ear earbuds. In some embodiments, the user initiates the alert, e.g., by stating the word "play," which it is desirable to follow, in some embodiments, by some identifier for the content to be played. In some of these embodiments, step 435 is omitted. In step 437, the user is prompted for input in response for the alert; and the alert context time window of opportunity is initiated. Control passes to step 427 to process any user spoken response to the alert, e.g., received as microphone and activation button signals. In some embodiments, the prompts include an audio invitation to say one or more of the limited vocabulary commands associated with the alert. In some embodiments, the user is assumed to know the limited vocabulary responses, and step 437 is omitted.

In some embodiments, the alerts (and any prompts) are included in the audio data received from the remote personal audio service 143 through the wireless transceiver 212 and played in step 433; so steps 413, 415, 435 and 437 are omitted.

If it is determined in step 413 that there is not an alert condition, or if step 413 is omitted, then control passes to step 439. In step 439, it is determined whether there is a change in the in-ear earbuds (e.g., an in-ear earbud is removed or an out of ear earbud is placed in the user's ear). If so, the process continues at step 407. If not, then in step 441 it is determined whether the user is done with the device, e.g., by speaking the phrase "unit off," or "Done." If so, then the process ends. Otherwise, the process continues at step 427, described above.

Thus, the audio interface unit 160 is capable of presenting network service data as audio in one or more earbuds and responding based on user sounds spoken into a microphone. In the illustrated embodiment, the audio interface unit 160 determines, based on data received from an in-ear detector in communication with a data communications bus, whether the earbud speaker is in place in an ear of the user. If the speaker is determined not in place in the ear of the user, then the audio interface unit 160 terminates presentation of the received audio data at the speaker.

The audio interface unit 160, in some embodiments, determines whether to present the audio data by sending data indicating the spoken word to a remote service and receiving, from the remote service, data indicating whether to initiate presentation of the audio data. In some embodiments, the data indicating whether to initiate presentation of the audio data is the audio data to be presented, itself. In some embodiments, the determination whether to present the audio data further comprises converting the spoken word to text in a speech to text module of the text-audio processor and determining whether to initiate presentation of the audio data based on the text. In some embodiments, the initiation of the presentation of the received audio data at the speaker further comprises converting audio data received as text from the different apparatus to speech in a text to speech module of the text-audio processor.

In some embodiments, a memory in communication with a data communications bus includes data indicating a limited vocabulary of text for the speech to text module, wherein the limited vocabulary represents a limited set of verbal commands to which the apparatus responds. In some embodiments, the apparatus is small enough to be hidden in an article of clothing worn by the user. In some embodiments, a single button indicates a context sensitive user response to the presentation of the received audio data at the speaker.

Figure 10:
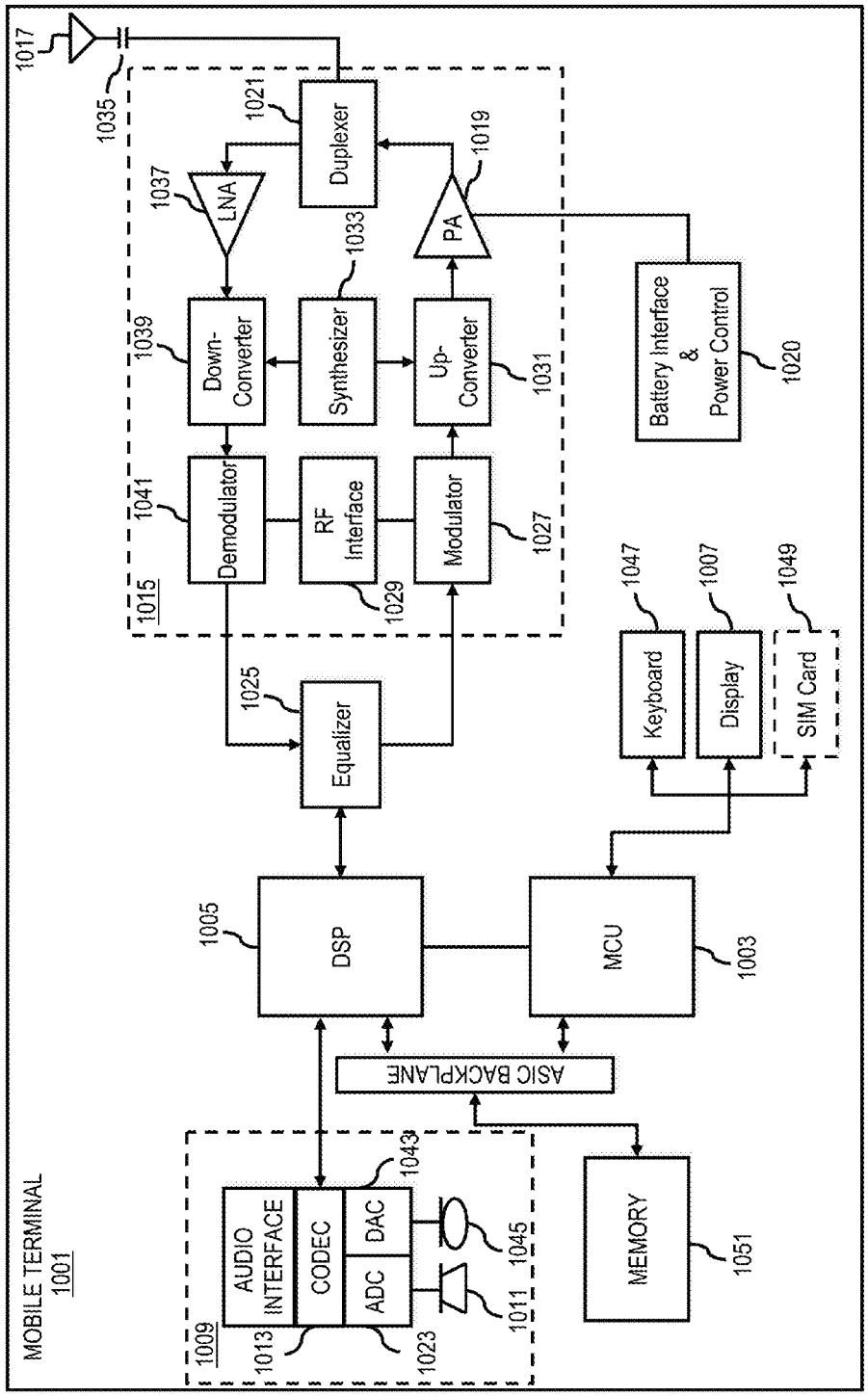
FIG. 10 is a diagram of a mobile terminal (e.g., handset) that can be used to implement an embodiment of the invention.

FIG. 4B is a flowchart of an example process 450 for providing network services at a personal audio agent in communication between a personal audio service 143 and an audio interface unit 160, according to one embodiment. In one embodiment, the personal audio agent process 145 on UE 101 performs the process 450 and is implemented in, for instance, a chip set including a processor and a memory as shown FIG. 9 or one or more components of a general purpose computer as shown in FIG. 8, such as logic encoded in tangible media, or in a mobile terminal as shown in FIG. 10.

In step 453, the audio interface units in range over wireless link 107*b* are determined. In the illustrated embodiment, it is determined that the audio interface unit 160 is in range over wireless link 107*b*. In step 455, a connection is established with the personal audio client 161 on the audio interface unit 160 in range.

In step 457, it is determined whether a message is received for a personal audio service (e.g., service 143) from a personal audio client (e.g., client 161). If so then in step 459 the message is forwarded to the personal audio service (e.g., service 143).

In step 461, it is determined whether a phone call is received for a user of the audio interface unit in range. For example, if the user has not indicated to the personal audio service 143 to direct all phone calls to the service, and the audio interface unit does not have a full cellular engine, then it is possible that the user receives a cellular telephone call on UE 101. That call is recognized by the personal audio agent in step 461.

If such a call is received, then in step 463, a phone call alert is forwarded to the personal audio client on the audio interface unit to be presented in one or more in-ear earbuds. In some embodiments, in which the audio interface unit includes a full cellular engine, or in which all calls are forwarded to the personal audio service 143, step 461 and step 463 are omitted.

In step 465 it is determined whether audio data for an audio channel is received in one or more data packets from a personal audio service (e.g., service 143) for a personal audio client (e.g., client 161) on an in-range audio interface unit. If so, then in step 467 the audio channel data is forwarded to the personal audio client (e.g., client 161).

In step 469, it is determined whether the process is done, e.g., by the audio interface unit (e.g., unit 160) moving out of range, or by receiving an end of session message from the personal audio service (e.g., service 143), or by receiving an offline message from the personal audio client (e.g., client 161). If so, then the process ends. If not, then step 457 and following steps are repeated.

FIG. 5A is a flowchart of an example process 500 for providing network services at a personal audio service, according to one embodiment. In one embodiment, the personal audio service 143 on the host 140 performs the process 500 and is implemented in, for instance, a chip set including a processor and a memory as shown FIG. 9 or one or more components of a general purpose computer as shown in FIG. 8, including logic encoded in tangible media. In certain embodiments, some or all the steps in FIG. 5A, or portions thereof, are performed on the audio interface unit 160 or on UE 101, or some combination.

FIG. 6A is a diagram of components of a personal audio service module 630, according to an embodiment. The module 630 includes a web user interface 635, a time-based input module 632, an event cache 634, an organization module 636, and a delivery module 638. The personal audio service module 630 interacts with the personal audio client 161, a web browser (such as browser 109), and network services 639 (such as social network service 133) on the same or different hosts connected to network 105.

The web user interface module 635 interacts with the web browser (e.g., browser 109) to allow the user to specify what content and notifications (also called alerts herein) to present through the personal audio client as output of a speaker (e.g., one or more earbuds 220) and under what conditions. Thus web user interface 635 facilitates access to, including granting access rights for, a user interface configured to receive first data that indicates a first set of one or more sources of content for presentation to a user, and to receive second data that indicates a second set of zero or more time-sensitive alerts for presentation to the user. Details about the functions provided by web user interface 635 are more fully described below with reference to steps 503 through 513 of FIG. 5A and in FIG. 5B. In brief, the web user interface module 635 is a web accessible component of the personal audio service where the user can: (1) manage services and feeds for the user's own channel of audio; (2) set rules to filter and prioritize content delivery; and (3) visualize the information flow. The data provided through web user interface 635 is used to control the data acquired by the time-based input module 632; and the way that data is arranged in time by organization module 636. In some embodiments, the visualization provided by the web interface module 635 includes a graphical time line, as described in more detail below with reference to FIG. 12A and FIG. 2C. In some embodiments, the web interface module 635 includes a graphical user interface that includes one or more active areas associated with one or more components of the timeline, as described in more detail below.

The time-based input module 632, acquires the content used to populate one or more channels defined by the user. Sources of content for presentation include one or more of voice calls, short message service (SMS) text messages (including TWITTER™), instant messaging (IM) text messages, electronic mail text messages, Really Simple Syndication (RSS) feeds, status or other communications of different users who are associated with the user in a social network service (such as social networks that indicate what a friend associated with the user is doing and where a friend is located), broadcast programs, world wide web pages on the internet, streaming media, music, television broadcasting, radio broadcasting, games, or other applications shared across a network, including any news, radio, communications, calendar events, transportation (e.g., traffic advisory, next scheduled bus), television show, and sports score update, among others. This content is acquired by one or more modules included in the time-based input module such as an RSS aggregator module 632a, an application programming interface (API) module 632b for one or more network applications, and a received calls module 632c for SD or HD audio calls forwarded to the personal audio service 630, e.g., from one or more land lines, pagers, cell phones etc. associated with the user.

The RSS aggregation module 632a regularly collects any kind of time based content, e.g., email, twitter, speaking clock, news, calendar, traffic, calls, SMS, radio schedules, radio broadcasts, in addition to anything that can be encoded in RSS feeds. The received calls module 632c enables cellular communications, such as voice and data following the GSM/3G protocol to be exchanged with the audio interface unit through the personal audio client 161.

The application programming interface (API) module 632b provides access to the personal audio service from other applications, such as the social network service, e.g., through the timeline graphical user interface, described in more detail below. In some embodiments, the interaction is used to affect what content and alerts are included in the audio channel, or to add browsers or other audio interface units to the recipients of the audio channel content.

In the illustrated embodiment, the time-based input module 632 also includes a received sounds module 632d for sounds detected at a microphone 236 on an audio interface unit 160 and passed to the personal audio service module 630 by the personal audio client 161.

Some of the time-based input is classified as a time-sensitive alert or notification that allows the user to respond optionally, e.g., a notification of an incoming voice call that the user can choose to take immediately or bounce to a voicemail service. The time-sensitive alerts includes at least one of a notification of an incoming voice call, a notification of incoming text (SMS, IM, email, TWITTER™), a notification of incoming invitation to listen to an audio stream of a different user, a notification of breaking news, a notification of a busy voice call, a notification of a change in a status of a different user who is associated with the user in a social network service, a notification of a broadcast program, notification of an internet prompt, a reminder set previously by the user, or a request to authenticate the user, among others.

The event cache 634 stores the received content temporarily for a time that is appropriate to the particular content by default or based on user input to the web user interface module 635 or some combination. Some events associated with received content, such as time and type and name of content, or data flagged by a user, are stored permanently in an event log by the event cache module 634, either by default or based on user input to the web user interface module 635, or time-based input by the user through received sounds module 632*d*, or some combination. In some embodiments, the event log is searchable, with or without a permanent index. In some embodiments, temporarily cached content is also searchable. Searching is performed in response to a verbal command from the user delivered through received sounds module 632*d*, as described in more detail below, with reference to FIG. 7, or through a timeline graphical user interface, as described below with reference to FIG. 11 and FIG. 12A through FIG. 12C.

The organization module 636 filters and prioritizes and schedules delivery of the content and alerts based on defaults or values provided by the user through the web user interface 635, or API 632*b*, or some combination. The organization module 636 uses rules-based processing to filter and prioritize content, e.g., don't interrupt user with any news content between 8 AM and LOAM, or block calls from a particular number. The organization module 636 decides the relative importance of content and when to deliver it. If there are multiple instances of the same kind of content, e.g., 15 emails, then these are grouped together and delivered appropriately. The organized content is passed onto the delivery module 638.

The delivery module 638 takes content and optimizes it for difference devices and services. In the illustrated embodiment, the delivery module 638 includes a voice to text module 698*a*, an API 638*b* for external network applications, a text to voice module 638*c*, and a cellular delivery module 638*d*. API module 638*b* delivers some content or sounds received in module 632*d* to an application program or server or client somewhere on the network, as encoded audio or text in data packets exchanged using any known network protocol. For example, in some embodiments, the API module 638*b* is configured to deliver text or audio or both to a web browser, as indicated by the dotted arrow to browser 109 for the mobile terminal, and browser 690 for some other device, such as a device belonging to a friend of the user on a social network. In some embodiments, the API delivers an icon to be presented in a different network application, e.g., a social network application; and, module 638*b* responds to selection of the icon with one or more choices to deliver audio from the user's audio channel or deliver text, such as transcribed voice or the user's recorded log of channel events. For some applications or clients (e.g., for user input to network services 639, e.g., in response to a prompt from an internet service) voice content or microphone sounds received in module 632*d* are first converted to text in the voice to text module 638*a*. The voice to text module 638*a* also provides additional services like: call transcriptions, voice mail transcriptions, and note to self, among others. Cellular delivery module 638*d* delivers some content or sounds received in module 632*d* to a cellular terminal, as audio using a cellular telephone protocol, such as GSM/3G. For some applications, text content is first converted to voice in the text to voice module 638*c*, e.g., for delivery to an audio interface unit, e.g. audio interface unit 160 of the user through the personal audio client 161, or the audio interface unit of a friend of the user on a social network.

Referring again to FIG. 5A, in step 503, a logon request is received from user equipment (UE). For example an HTTP request is received from browser 109 on UE 101 based on input provided by user 190. In some embodiments, step 503 includes authenticating a user as a subscriber or registering a user as a new subscriber, as is well known in the art. In step 505, a user interface, such as a web page, is generated for the user to specify audio preferences and alert conditions to be used for an audio interface unit of the user (e.g., audio interface unit 160 of user 190). In some embodiments, step 505 includes step 591 to include a graphical user interface that includes a timeline that depicts the sequence of audio contents, as described in more detail below with reference to FIG. 11. In step 507, the interface is sent to the user equipment.

FIG. 6B is a diagram of an example user interface 600 utilized in a portion of the process of FIG. 5, according to an embodiment. The example user interface 600 is referred to as the "Hello" page to indicate that the interface is for setting up audio sessions, alerts and responses, such as the common spoken greeting and response "Hello." In the illustrated embodiment, the Hello page 600 is sent from web user interface module 635 to the browser 109 on UE 101 during step 507.

The Hello page 600 includes options for the user to select from a variety of network services that can be delivered to the user's audio interface unit 160. For example, the left panel 610 indicates the user may select from several personal audio service options listed as "Hello channel," "Calls," "Messages," "Notes," "Marked," and "Service Notes." These options refer to actions taken entirely by the personal audio service 143 on behalf of a particular user. In addition, the user can indicate other network entities to communicate with, through personal audio service 143 and the audio interface unit 160, such as "Contacts," "Services," and "Devices." These options refer to actions taken by third party entities other than the personal audio service 143 and personal audio client 161. Contacts involve others who may communicate with the user through phone calls, emails, text messages and other protocols that do not necessarily involve an audio interface unit 160. Services are provided by service providers on the internet and one or more phone networks, including a cellular telephone network or HD audio telephony. Devices involve personal area network devices that could serve as the audio interface unit 160 or with which the audio interface unit 160 could potentially communicate via the Bluetooth protocol. The user navigates the items of the Hello page to determine what services to obtain from the personal audio service 143 and how the personal audio service 143 is to interact with these other entities to deliver audio to the device serving as the audio interface unit 160. In some embodiments, a timeline graphical user interface 612 is included, as described in more detail below.

Any audio and text data may be channeled to and from the audio interface unit 160 by the personal audio service 143 and the personal audio client 161. Text provided by services is converted by the personal audio service 143 to audio (speech). In the illustrated embodiment, the third party services that can be selected to be channeled through the personal audio service 143 to the audio interface unit 160 are indicated by lines 622*a* through 622*k* and include voice calls 622*a*, voice messaging 622*b*, reminders 622*c*, note taking 622*d*, news alerts 622*e*, search engines 622*f*, bulk short message service (SMS) protocol messaging 622*g* such as TWITTER™, social network services 622*h* such as FACEBOOK™, playlist services 622*i* such as LASTFM™, sports feed services 622*j* such as ESPN GAMEPLAN™, and cooking services 622*k*. In the illustrated embodiment, the user has selected some of these services by marking an associated checkbox 623 (indicted by the x in the box to the left of the name of the third party service). When one of the third party services is highlighted, any sub-options are also presented. For example, the voice calling service 622*a* includes sub-options 626 for selecting a directory as a source of phone numbers to call, as well as options 628 to select favorites, add a directory and upgrade service.

Referring again to FIG. 5A, in step 509, it is determined whether a response has been received from a user, e.g., whether an HTTP message is received indicating one or more services or sub-options have been selected. If so, then in step 511 the audio preferences and alert conditions for the user are updated based on the response. For example, in step 511*a* unique identifier for the audio interface unit 160 is indicated in a user response and associated with a registered user. In some embodiments, step 511 includes step 593 to operate on audio content, e.g. to update contents or delivery device or alerts, alone or in some combination, based on user response indicated in the timeline graphical user interface included in the browser, as described in more detail below with reference to FIG. 11. In step 513, it is determined if the interaction with the user is done, e.g., the user has logged off or the session has timed out. If not, control passes back to step 505 and following to generate and send an updated interface, such as an updated web page. If a response is not received then, in step 513, it is determined if the interaction is done, e.g., the session has timed out.

Figure 6C:
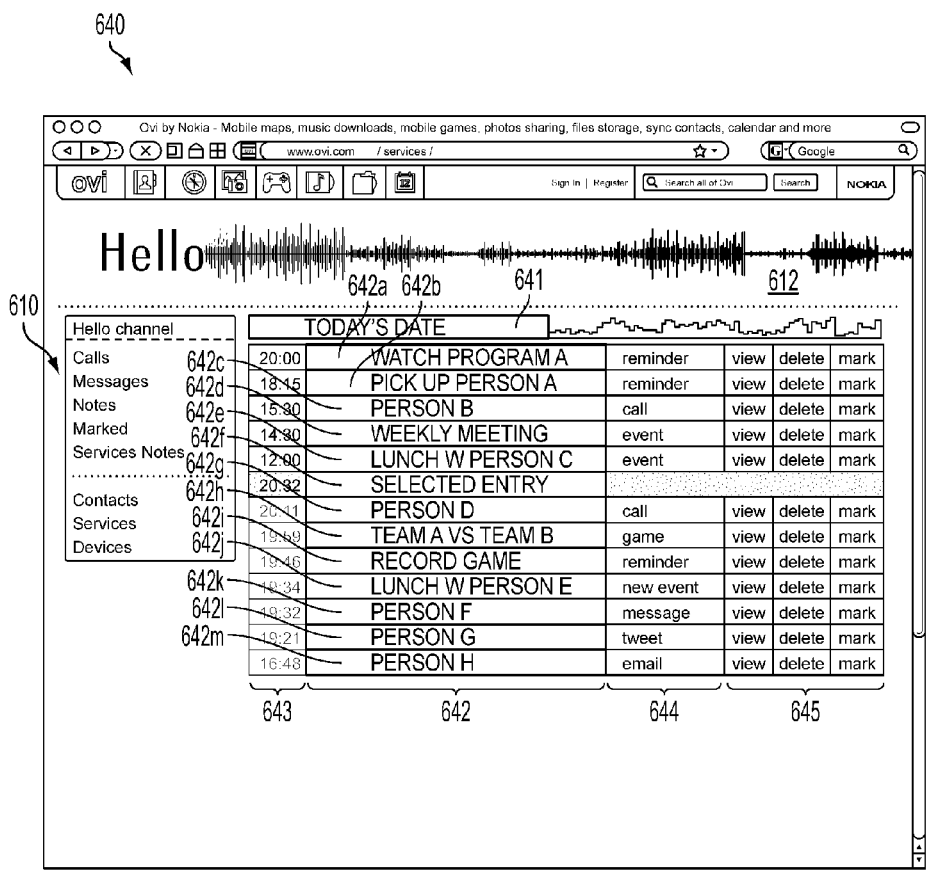
FIG. 6C is a diagram of another example user interface utilized in a portion of the process of FIG. 5A, according to an embodiment.

The Hello channel option presents a web page that displays the event log for a particular channel defined by the user. FIG. 6C is a diagram of another example user interface 640 utilized in a portion of the process of FIG. 5A, according to an embodiment. Page 640 depicts the event log for one of the user's channels, as indicated by the "Hello channel" option highlighted in panel 610. In some embodiments the events are indicated by symbols in the timeline graphical user interface 612, as described in more detail below. The page 640 shows today's date in field 641, and various events in fields 642*a* through 642*m* from most recent to oldest (today's entries shaded), along with corresponding times in column 643, type of event in column 644. Options column 645 allows the user to view more about the event, to mark the event for easy access or to delete the event from the log. In the illustrated embodiment, the events include a reminder to watch program A 642*a*, a reminder to pick up person A 642*b*, a call to person B 642*c*, a weekly meeting 642*d*, a lunch with person C 642*e*, a manually selected entry 642*f*, a call with person D 642*g*, a game between team A and Team B 642*h*, a previous reminder to record the game 642*i*, lunch with person E 642*j*, a message from person F 642*k*, a tweet from person G 642*l*, and an email from person H 642*m*.

FIG. 5B is a flowchart of an example process 530 for one step of the method of FIG. 5A, according to one embodiment. Process 530 is a particular embodiment of step 511 to update audio preferences and alert conditions based on user input. In some embodiment, one or more steps of process 530 are performed using the timeline graphical user interface, as described in more detail below.

In step 533, the user is prompted for and responses are received from the user for data that indicates expressions to be used to indicate allowed actions. The actions are fixed by the module; but the expressions used to indicate those actions may be set by the user to account for different cultures and languages. Example allowed actions, described in more detail below with reference to FIG. 7B through FIG. 7F, include ANSWER, IGNORE, RECORD, NOTE, TRANSCRIBE, INVITE, ACCEPT, SEND, CALL, TEXT, EMAIL, STATUS, MORE, START, PAUSE, STOP, REPEAT, TUNE-IN, SLOW, MIKE, among others. For purposes of illustration, it is assumed herein that the expressions are the same as the associated actions. In some embodiments, synonyms for the terms defined in this step are learned by the personal audio service 630, as described in more detail below. Any method may be used to receive this data. For example, in various embodiments, the data is included as a default value in software instructions, is received as manual input from a user or service administrator on the local or a remote node, is retrieved from a local file or database, or is sent from a different node on the network, either in response to a query or unsolicited, or the data is received using some combination of these methods.

In step 535, the user is prompted for or data is received or both, for data that indicates one or more devices the user employs to get or send audio data, or both. Again, any method may be used to receive this data. For example, during step 535 the user provides a unique identifier for the audio interface unit (e.g., unit 160) or cell phone (e.g., UE 101), such as a serial number or media access control (MAC) number, that the user will employ to access the personal audio service 143.

In step 537, the user is prompted for or data is received or both, for data that indicates a channel identifier. Again, any method may be used to receive this data. This data is used to distinguish between multiple channels that a user may define. For example, the user may indicate a channel ID of "Music" or "news" or "One" or "Two." In steps 539 through 551, data is received that indicates what constitutes example content and alerts for the channel identified in step 537. In step 553, it is determined whether there is another channel to be defined. If so, control passes back to step 537 and following for the next channel. If not, then process 530 (for step 511) is finished.

In step 539, the user is prompted for or data is received or both, for data that indicates voice call handling, priority and alert tones. The data received in this step indicates, for example, which phone numbers associated with the user are to be routed through the personal audio service, and at what time intervals, a source of contact names and phone numbers, phone number of contacts to block, phone numbers of contacts to give expedited treatment, and different tones for contacts in the regular and expedited categories, and different tones for incoming calls and voice messages, among other properties for handling voice calls.

In step 541, the user is prompted for or data is received or both, for data that indicates text-based message handling, priority and alert tones. The data received in this step indicates, for example, which text-based messages are to be passed through the personal audio service and the user's network address for those messages, such as SMS messages, TWITTER™, instant messaging for one or more instant messaging accounts, emails for one or more email accounts, and at what time intervals. This data also indicates a source of contact names and addresses, addresses of contacts to block, addresses of contacts to give expedited treatment, and different tones for contacts in the regular and expedited categories, and different tones for different kinds of text-based messaging.

In step 543, the user is prompted for or data is received or both, for data that indicates one or more other network services, such as RSS feeds on traffic, weather, news, politics, entertainment, and other network services such as navigation, media steaming, and social networks. The data also indicates time intervals, if any, for featuring one or more of the network services, e.g., news before noon, entertainment after noon, social network in the evening.

In step 545, the user is prompted for or data is received or both, for data that indicates how to deliver alerts, e.g., alerts in only one ear if two earbuds are in place, leaving any other audio in the other ear. This allows the user to apply the natural ability for ignoring some conversations in the user's vicinity to ignore the alert and continue to enjoy the audio program. Other alternatives include, for example, alerts in one or both in-ear earbuds and pause the audio or skip the audio during the interval the alert is in effect, alerts for voice ahead of alerts for text-messages, and clustering rather than individual alerts for the same type of notification, e.g., "15 new emails" instead of "email from person A at 10 AM, email from person B at 10.35 AM, . . . ".

In step 547, the user is prompted for or data is received or both, for data that indicates manually entered reminders from the user, e.g., wake up at 6:45 AM, game starts in half hour at 7:15 PM, game starts at 7:45 PM, and make restaurant reservation 5:05 PM."

In step 549, the user is prompted for or data is received or both, for data that indicates what speech to transcribe to text (limited by what is legal in the user's local jurisdiction), e.g., user's side of voice calls, both sides of voice calls, other person side of voice calls from work numbers, and all sounds from user's microphone for a particular time interval.

In step 551, the user is prompted for or data is received or both, for data that indicates what audio or text to publish for other users to access and what alerts, if any, to include. Thus, a user can publish the channel identified in step 537 (e.g., the "Music" channel) for use by other users of the system (e.g., all the user's friends on a social network). Similarly, the user can publish the text generated from voice calls with work phone numbers for access by one or more other specified colleagues at work.

The above steps are based on interactions between the personal user service 143 and a browser on a conventional device with visual display and keyboard of multiple keys, such as browser 109 on UE 101. The following steps, in contrast, are based on interactions between the personal user service 143 and a personal audio client 161 on an audio interface unit 160 or other device serving as such, which responds to user input including voice commands.

Referring again to FIG. 5A, in step 531 it is determined whether the audio interface unit is offline. For example, if no message has been received from the unit for an extended time, indicating the unit may be powered off, then it is determined in step 531 that the audio interface unit 160 is offline. As another example, a message is received from the personal audio client 161 that the unit is offline based on the message sent in step 411, because no earbud speaker was detected in position in either of the user's ears.

If it is determined in step 513 that the audio interface unit 160 is offline, then, in step 533 it is determined whether there is an alert condition. If not, then step 531 is repeated. If so, then, in step 535, data indicating filtered alerts are stored. As described above, with reference to step 417, alerts that have no meaning when delayed are filtered out; and the filtered alerts are those that still have meaning at a later time. The filtered alerts are stored for delayed delivery. Control passes back to step 531.

If it is determined in step 531 that the audio interface unit 160 is online, then in step 515 the personal audio service 143 requests or otherwise receives data indicated by the user's audio preferences and alert conditions. For example, the personal audio service 143 sends requests that indicate phone calls for the user's cell phone or land line or both are to be forwarded to the personal audio service 143 to be processed. Similarly, the personal audio service 143 requests any Really Simple Syndication (RSS) feeds, such as an internet news feed, indicated by the user in responses received in step 509. In an illustrated embodiment, step 515 is performed by the time-based input module 632.

In step 517, one or more audio channels are constructed for the user based on the audio preferences and received data. For example, the user may have defined via responses in step 509 a first channel for music from a particular playlist in the user's profile on the social network. Similarly, the user may have defined via responses in step 509 a second channel for an RSS feed from a particular news feed, e.g., sports, with interruptions for breaking news from another news source, e.g., world politics, and interruption for regular weather updates on the half hour, and to publish this channel so that other contacts of the user on the social network can also select the same channel to be presented at their devices, including their audio interface devices. In step 517, for this example, audio streams for both audio channels are constructed. In an illustrated embodiment, step 517 is performed by caching content and logging events by event cache module 634. In some embodiments, step 517 includes step 595 to store the sequence of contents for a graphical user interface, and to include content or alerts from a friend of the user on a social network, such as received in response to a timeline graphical user interface accessed through the friend's social network page, as described in more detail below.

In step 519, it is determined whether any alert conditions are satisfied, based on the alert conditions defined in one or more user responses during step 509. If so, then in step 521 the alerts are added to one or more channels depending on the channel definitions given by the user in responses received in step 509. For example, if there are any stored filtered alerts from step 535 that have not yet been delivered, these alerts are added to one or more of the channels. For example, if the user has defined the first channel such that it should be interrupted in one ear only by any alerts, with a higher priority for alerts related to changes in status of contacts in a social network than to breaking news alerts and a highest priority for alerts for incoming voice calls, the stored and new alerts are presented in that order on the first channel. Similarly, the user may have defined a different priority of alerts for the second channel, and the stored and new alerts are added to the second channel with that different priority. In some embodiments, alerts are not added to a published channel delivered to another user unless the user defining the channel indicates those alerts are to be published also. In an illustrated embodiment, steps 519 and 521 are performed by organization module 636. In some embodiments, step 521 includes step 597 to add alerts indicated by a friend of the user on a social network, as described in more detail in a alter section.

After any alerts are added, or if there are no alerts, then control passes to step 523. In step 523, the audio from the selected channel with any embedded alerts are sent to the personal audio client 161 over a wireless link to be presented in one or more earbuds in place in a user's ear. For example, the audio is encoded as data and delivered in one or more data packets to the personal audio client 161 on audio interface unit 160 of user 190. In some embodiments, the data packets with the audio data travel through wireless link 107a directly from a cell phone network, or a wide area network (WAN), or wireless local area network (WLAN). In some embodiments, the data packets with the audio data travel indirectly through personal audio agent process 145 on UE 101 and thence through wireless link 107b in a wireless personal area network (WPLAN) to personal audio client 161. In an illustrated embodiment, step 523 is performed by delivery module 638. In some embodiments, the audio data is sent to a browser for presentation to the user during step 523. In some embodiments, step 523 includes step 599 to send the audio data to the browser or audio interface unit of a friend of the user on a social network.

In step 525, it is determined if a user response message is received from the personal audio client 161 of user 190. In an illustrated embodiment, step 525 is performed by received sounds module 632*d*. If so, in step 527 an action is determined based on the response received and the action is performed. In some embodiments, the response received from the personal audio client is text converted from spoken sounds by the text-audio processor of the personal audio client. In some embodiments, the response received from the personal audio client 161 is coded audio that represents the actual sounds picked up the microphone of the audio interface unit 160 and placed in the response message and sent by the personal audio client 161. In an illustrated embodiment, step 527 is performed by organization module 636 or delivery module 638, or some combination.

The action determined and performed in step 527 is based on the user response in the message received. Thus, if the response indicates the user spoke the word "voicemail", then the voicemail is contacted to obtain any voice messages, which are then encoded in messages and sent to the personal audio client 161 for presentation in one or more in-ear earbuds of the user. Similarly, if the response indicates the user spoke the word "Channel Two", then this is determined in step 527 and in step 523, when next executed, the second channel is sent to the personal audio client 161 instead of the first channel.

In step 529, it is determined if the personal audio service is done with the current user, e.g., the user has gone offline by turning off the audio interface unit 160 or removing all earbuds. If not, control passes back to step 505 and following steps to update the graphical user interface and request and receive the data indicated by the updates.

Figure 7:
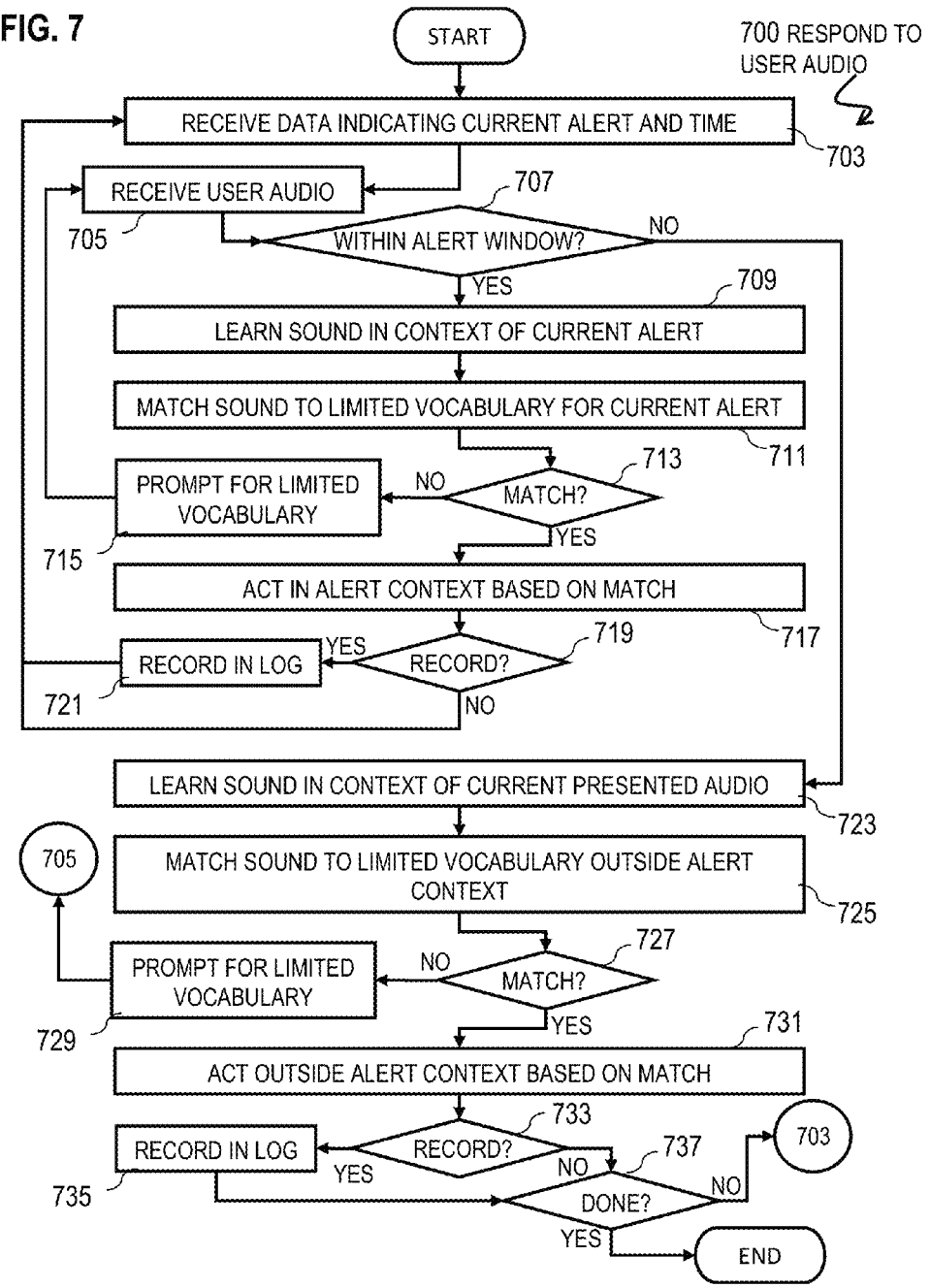
FIG. 7 is a flowchart of an example process 700 for responding to user audio input, according to one embodiment.

FIG. 7 is a flowchart of an example process 700 for responding to user audio input, according to one embodiment. By way of example, process 700 is a particular embodiment of step 527 of process 500 of FIG. 5A to respond to user audio input through a microphone (e.g., microphones 236).

In step 703 data is received that indicates the current alert and time that the alert was issued. For example, in some embodiments this data is retrieved from memory where the information is stored during step 521. In step 705, the user audio is received, e.g., as encoded audio in one or more data packets.

In step 707, it is determined whether the user audio was spoken within a time window of opportunity associated with the alert, e.g. within 3 seconds of the time the user received the tone and any message associated with the alert, or within 5 seconds of the user uttering a word that set a window of opportunity for responding to a limited vocabulary. In some embodiments, the duration of the window of opportunity is set by the user in interactions with the web user interface 635. If so, then the user audio is interpreted in the context of a limited vocabulary of allowed actions following that particular kind of alert, as described below with respect to steps 709 through 721. If not, then the user audio is interpreted in a broader context, e.g., with a larger vocabulary of allowed actions, as described below with respect to steps 723 through 737.

In step 709, the sound made by the user is learned in the context of the current alert, e.g., the sound is recorded in association with the current alert. In some embodiments, step 709 includes determining the number of times the user made a similar sound, and if the number exceeds a threshold and the sound does not convert to a word in the limited vocabulary then determining if the sound corresponds to a synonym for one of the words of the limited vocabulary. This determination may be made in any manner, e.g., by checking a thesaurus database, or by generating voice that asks the user to identify which allowed action the sound corresponds to, or by recording the user response to a prompt issued in step 715 when a match is not obtained. Thus the process 700 learns user preferences for synonyms for the limited vocabulary representing the allowed actions. Thus, the system learns what kind of new vocabulary is desirable; can know how the user usually answers to certain friends; and that way can interpret and learn the words based on communication practices within a social networking context for the user or the friend. So with step 709 together with step 533, instead of using a pre-set vocabulary, the user can record the user's own voice commands. In some embodiments, step 709 is omitted.

In step 711, the sound is compared to the limited vocabulary representing the allowed actions for the current alert, e.g., by converting to text and comparing the text to the stored terms (derived from step 533) for the allowed actions. In step 713, it is determined if there is a match. If not, then in step 715 the user is prompted to indicate an allowed action by sending audio to the user that presents voice derived from the text for one or more of the allowed actions and the start of the window of opportunity for the alert is re-set. A new response from the user is then received, eventually, in step 705. If there is a match determined in step 713, then in step 717 the personal audio service acts on the alert based on the match. Example alerts, limited vocabularies for matches and resulting actions are described in more detail below with reference to FIG. 7B through FIG. 7D. In step 719, it is determined whether conditions are satisfied for storing the action in the permanent log. If not, control passes back to step 703, described above. If so, then in step 721 the action is also recorded in the permanent log.

If it is determined, in step 707, that the user audio was not spoken within a time window of opportunity associated with the alert, then the audio is interpreted in a broader context. In step 723, the sound made by the user is learned in the context of the current presented audio, e.g., the sound is recorded in association with silence or a media stream or a broadcast sporting event. In some embodiments, step 723 includes determining the number of times the user made a similar sound, and if the number exceeds a threshold and the sound does not convert to a word in the broader vocabulary then determining if the sound corresponds to a synonym for one of the words of the broader vocabulary. This determination may be made in any manner, e.g., by checking a thesaurus database, or by generating voice that asks the user to identify which allowed action the sound corresponds to. Thus the process 700 learns user preferences for synonyms for the broader vocabulary representing the allowed actions for silence or a presented audio stream. In some embodiments, step 723 is omitted.

In step 725, the sound is compared to the broader vocabulary representing the allowed actions not associated with an alert, e.g., by converting to text and comparing the text to the stored terms (derived from step 533) for the allowed actions, or by comparing the user audio with stored voiceprints of the limited vocabulary. In step 727, it is determined if there is a match. If not, then in step 729 the user is prompted to indicate an allowed action by sending audio to the user that presents voice derived from the text for one or more of the allowed actions. A new response from the user is then received, eventually, in step 705. If there is a match determined in step 727, then in step 731 the personal audio service acts based on the match. Example limited vocabularies for matches and resulting actions are described in more detail below with reference to FIG. 7E for general actions and FIG. 7F for actions related to currently presented audio. In step 733, it is determined whether conditions are satisfied for storing the action in the permanent log. If not, then in step 737 it is determined if conditions are satisfied for terminating the process. If conditions are satisfied for storing the action, then in step 735 the action is also recorded in the permanent log. If it is determined, in step 737, that conditions are satisfied for terminating the process, then the process ends. Otherwise control passes back to step 703, described above.

FIG. 11 is a flowchart of an example process to provide a graphical user interface to control an audio channel, according to one embodiment. In step 1103 a timeline of past and planned/future audio contents for each audio channel is built, e.g., based on the event log, such as received/send messages, received/made calls, or based on calendar entries, user created entries, peers/friends created entries, accessed media, or based on the user preferences/profiles and actually delivered content in step 517. For example, user listens to song A from time T1 to time T2, user gets call/instant communication notice at time T2 until time T3 and answers call/instant communication at time T3 and talks until time T4, then user dictates email at time T5 until time T6, and then user listens to song B from time T7 to time T8. In step 1105, a graphical user interface is built that includes icons, as used herein, an icon is a set of picture elements, called pixels, for presentation on a video display device. The icons represent audio content arranged in sequence. Any icon may be used, including a graph, a photo, a symbol, an animation, an applet, a widget among others, alone or in any combination. The timeline graphical user interface includes active areas associated with each icon. The active areas are also associated with one or more actions that a user can take with a pointing device positioned over the active area, or with voice commands; and each action is associated with an operation that can be performed with the audio content indicated by the associated icon.

Figure 12A:
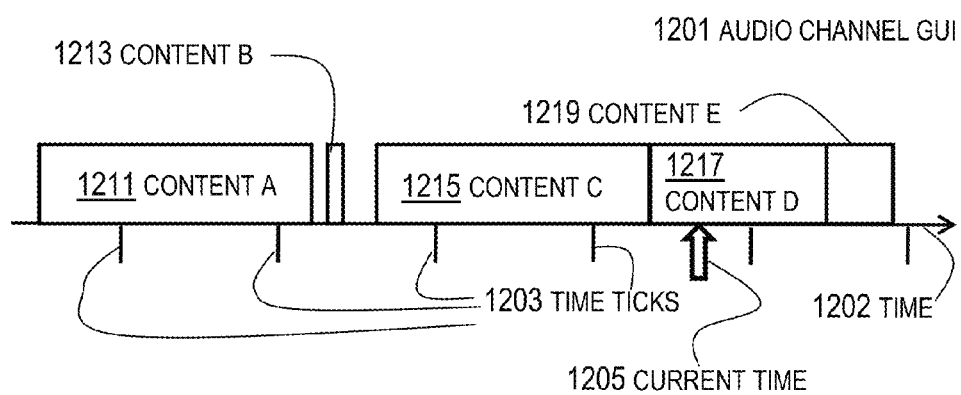
FIG. 12A is a diagram of a graphical user interface to control an audio channel, according to one embodiment.

FIG. 12A is a diagram of a graphical user interface 1201 to control an audio channel, according to one embodiment. The audio channel timeline GUI 1201 includes pixels that indicate a line segment 1202 indicting the direction of advancing time, with time tick marks (called ticks) 1203 indicating time intervals. The time intervals may be constant, as depicted, or not, e.g., compressed at ever earlier times. The current time is indicated by a current time icon 1205. Audio content is represented by icons that occupy a portion of the time line 1202, e.g., content A icon 1211, content B icon 1213 and content C icon 1215 for audio content previously rendered on the audio channel, content D icon 1217 for content currently being rendered on the audio channel, and content E icon 1219 for planned future rendering on the audio channel. Each icon is associated with an active area where certain user actions with a pointing device well known in the art, e.g., a right click of a mouse to generate a pull down menu and a left click to select a menu item, or voice commands, is used to indicate an operation to be performed on the associated audio content. Any operations may be indicated, such as identifying the audio content, converting audio to text, printing the text, playing a snippet of the audio content, storing an audio file, accessing an audio file, accessing an audio channel/stream, accessing live communication session, etc. In some embodiments, the icons are designed to indicate the type or source of the audio content as described in more detail below with reference to FIG. 12C. The present time icon/mark 1205 can be used to indicate that the user of the interface 1201 wishes to join in on listening to the audio channel. The future portions of the timeline 1202 can be used to schedule, add or change future content or alerts or both.

Returning again to FIG. 11, in step 1107, the audio channel timeline GUI is pushed to the user's audio service page, such as during step 591 described above, e.g., as timeline GUI 612 depicted above. In step 1109, it is determined whether the user has activated an item in the GUI, e.g., has selected a pull down menu item associated with one of the icons. If so, then in step 1111, an operation on the audio channel is performed based on the user response. For example, the selected past content is converted to text or indexed or published, or a new content or alert is added to the channel for rendering in the future.

In step 1113, a notice is sent to the social network service/server that the user has a particular active audio channel for sharing with friends, e.g., in a message that indicates the user and an audio channel identifier. In some embodiments in which the audio channel is not shared with friends, step 1113 and following steps are omitted. In some embodiments, the notice indicates a select group of social network friends with whom the audio channel can be shared and presented. The social network is configured to indicate to the friends that the audio channel is available for presentation to the user.

Figure 12B:
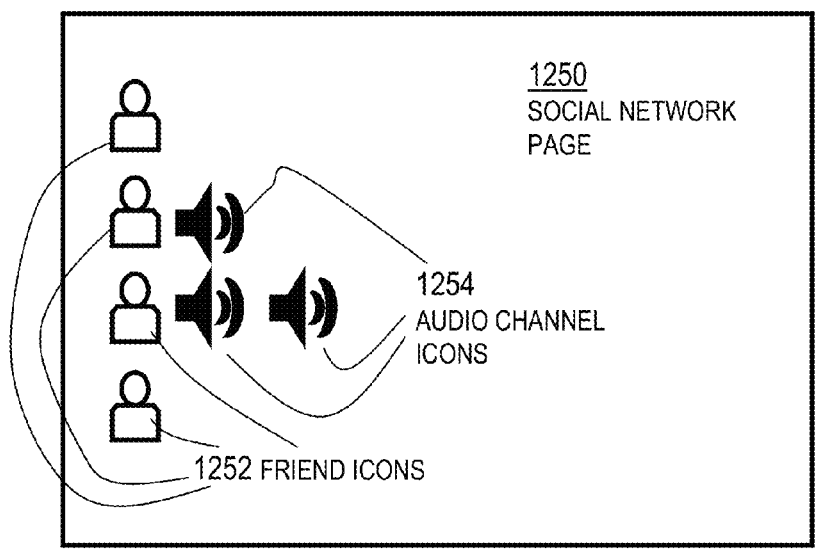
FIG. 12B is a diagram of a social network page on which the graphical user interface is available, according to one embodiment.

FIG. 12B is a diagram of a social network service page 1250 on which the graphical user interface is available, according to one embodiment. The page 1250 of a friend of the user indicates one or more friend icons 1252, one of which represents the user. For purposes of illustration, it is assumed that the second icon 1252 from the top represents the user. On page 1250, friends with one or more audio channels, as determined by the notice message sent in step 1113, are indicated by audio channel icons 1254. Each audio channel published by a friend is indicated by one of the icons 1254. As can be seen, one audio channel icon 1254 is associated with the user's icon on the friend's social network page 1250. Another friend indicated by the next friend icon 1252 has two published audio channels. When a friend wishes to get involved with the user's audio channel the friend selects the audio channel icon 1254, e.g., by activating a pointing device positioned over the audio channel icon 1254 of interest, or by voice commands. Alternatively, each audio channel timeline GUI may be automatically presented/opened to the friends as part of the social network service page 1250 in lieu of the speaker icons shown in FIG. 12B.

Referring again to FIG. 11, in step 1115, it is determined if a request for the audio channel timeline GUI is received from a friend of the user in the social network. For example, as a result of the friend selecting the audio channel icon 1254, a message is received from the social network service in step 1115 requesting the audio channel timeline GUI of the user on behalf of the friend. It is assumed for purposes of illustration that the request includes a network address and port for the friend's browser where the GUI is to be presented as a part of the friend's homepage. If not, control passes back to step 1109. If a request is received, however, then in step 1117, the audio channel timeline GUI is sent to and presented on the friend's browser displaying the social network page of the friend.

In step 1119 it is determined whether the friend has activated an item in the GUI, e.g., has selected a pull down menu item associated with one of the icons. If so, then in step 1121, an operation on the audio channel is performed based on the user response. For example, the selected past content is converted to text or indexed or published, or a new content or alert is added to the channel for rendering in the future.

In step 1123 it is determined, whether the friend has indicated a desire to listen to content from the user's audio channel, e.g., to join in listening to the channel as the user is hearing it. In some embodiments, the data indicating this desire is received in a request/message that indicates the destination for the audio content, e.g., the friend's browser or the friend's audio interface unit. If so, then in step 1125, the browser or audio interface unit of the friend is added to the delivery schedule to receive the audio content, e.g., from the delivery module 638.

In step 1127, it is determined whether interactions with the audio channel are complete. If so, the process ends. Otherwise control passes back to step 1107 to push an updated GUI to the user's audio service page, and following steps.

Additionally, the friend can amend one or more content items to the future part of the user's audio channel timeline GUI 1201 by mouse or voice commands so that an icon is presented for each of the content items on the timeline. Further, the icon is updated to all other presentations of the user's audio channel timeline on other friends' and user's own browsers. The icon is associated with information/metadata on the content item, a content item file and/or information how/where to access the content item file on a network.

Figure 12C:
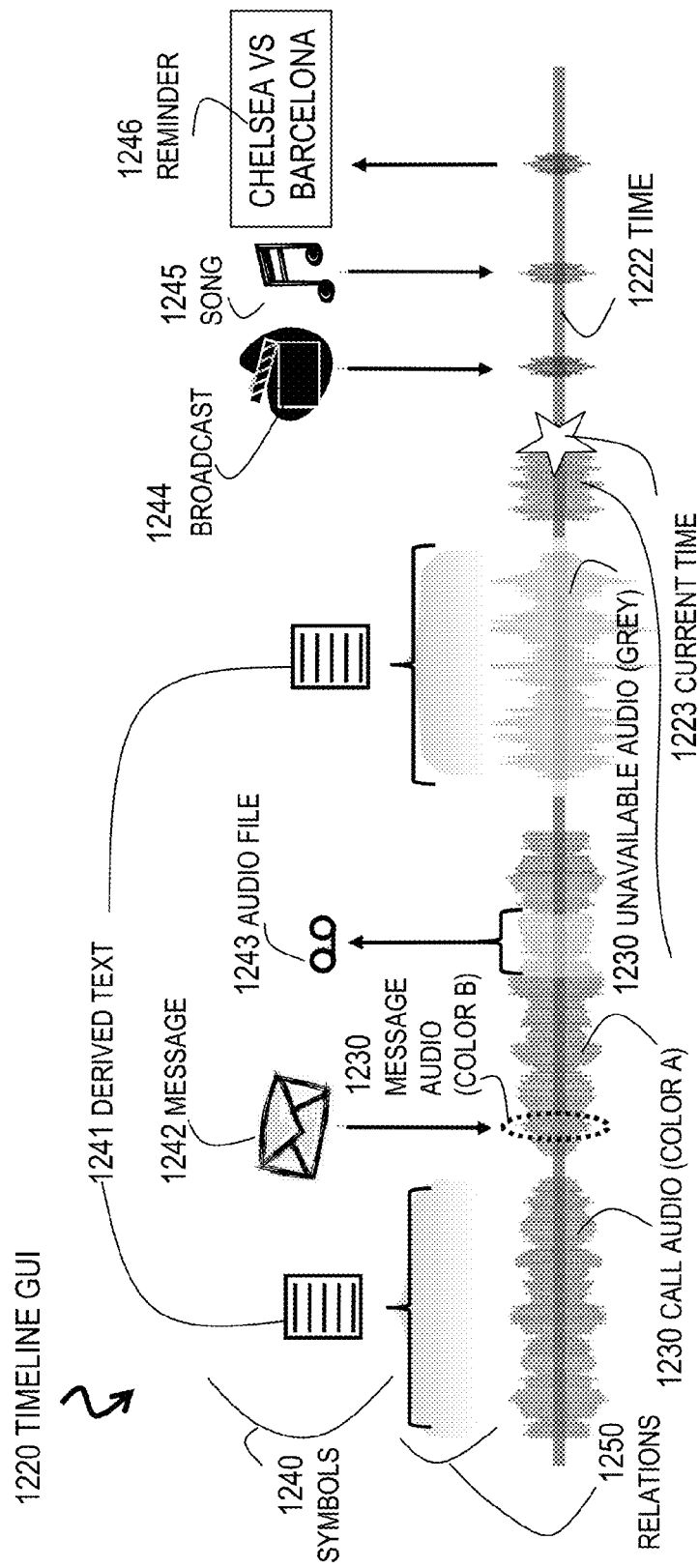
FIG. 12C is a diagram of a graphical user interface to control an audio channel, according to another embodiment.

FIG. 12C is a diagram of a graphical user interface 1220 to control an audio channel, according to another embodiment. The GUI 1120 includes a time axis 1222 with later time to the right of earlier time; and a current time icon 1223.

In the illustrated embodiment, each icon for content includes one or more of a pressure trace, a symbol or label, or a relationship, alone or in some combination. A pressure trace emulates a trace recorded by a pressure sensor as acoustic waves of varying amplitude pass by the sensor and extends for the duration of the audio content. In some embodiments, the trace is based on an actual pressure trace of the source audio indicated. In the illustrated embodiment, the trace is just an arbitrary representation to suggest audio data. In other embodiments, a simple rectangular box is used to indicate the audio data for the temporal duration of the content. Audio content that is available as sound or transcript is indicated by a colored pressure trace (or rectangle) with different colors indicating different types of audio. In the illustrated embodiment, color A (e.g., red) indicates telephone calls, including SD and HD audio telephone calls, and different color B (e.g., orange) indicates text to speech. Unavailable audio, e.g., copyrighted material that can't be reproduced directly, such as songs and broadcast audio, is indicated by a grey pressure trace. Alerts of different types are represented by a short duration pressure trace colored to indicate the type of alert, e.g., blue for broadcast content, brown for song, purple for text reminders.

The source or destination of the audio data is indicated by symbols. For example, text derived from the audio, such as speech-to-text or song title and artist, is represented by a derived text symbol 1241, e.g., a rectangle with parallel horizontal lines. A message, such as a text message, email or instant message is represented by an envelope 1242. An audio file containing all or a portion of the audio content is represented by a reel to reel symbol 1243. A broadcast source is represented by a scene mark symbol 1244, a song by a slurred note symbol 1245, and a reminder by a reminder text box 1246 containing the reminder as short text.

A relationship between the pressure trace and the source or destination symbol is represented by an arrow or bracket, which indicates relations 1250 in FIG. 12C. An incoming message or alert from a friend is indicated by an arrow from the symbol to the pressure trace. An alert or saved audio provided by the owner of the audio channel is represented by an upward arrow. A section of audio converted to text or audio file is indicated by a bracket.

At least some pixels of each icon form an active area where pointer device actions are used to indicate operations on the content, such as play, convert to text, index, join, publish, etc.

For purposes of illustration, it is assumed that timeline GUI 1220 represents all content delivered to a user on one audio channel defined and owned by that user. The user may choose to publish all or a part of the audio channel; and only the published portion is included as a timeline GUI presented to a friend of the user on a social network. A user may define multiple audio channels, e.g., for different themes, such as music, news, business, and a different timeline GUI is generated for each audio channel. A different portion of each may be published for use in the timeline GUI sent to a friend. A user may present multiple timelines of multiple friends, e.g., on the user's browser's home web page or a social network web page.

Figure 12D:
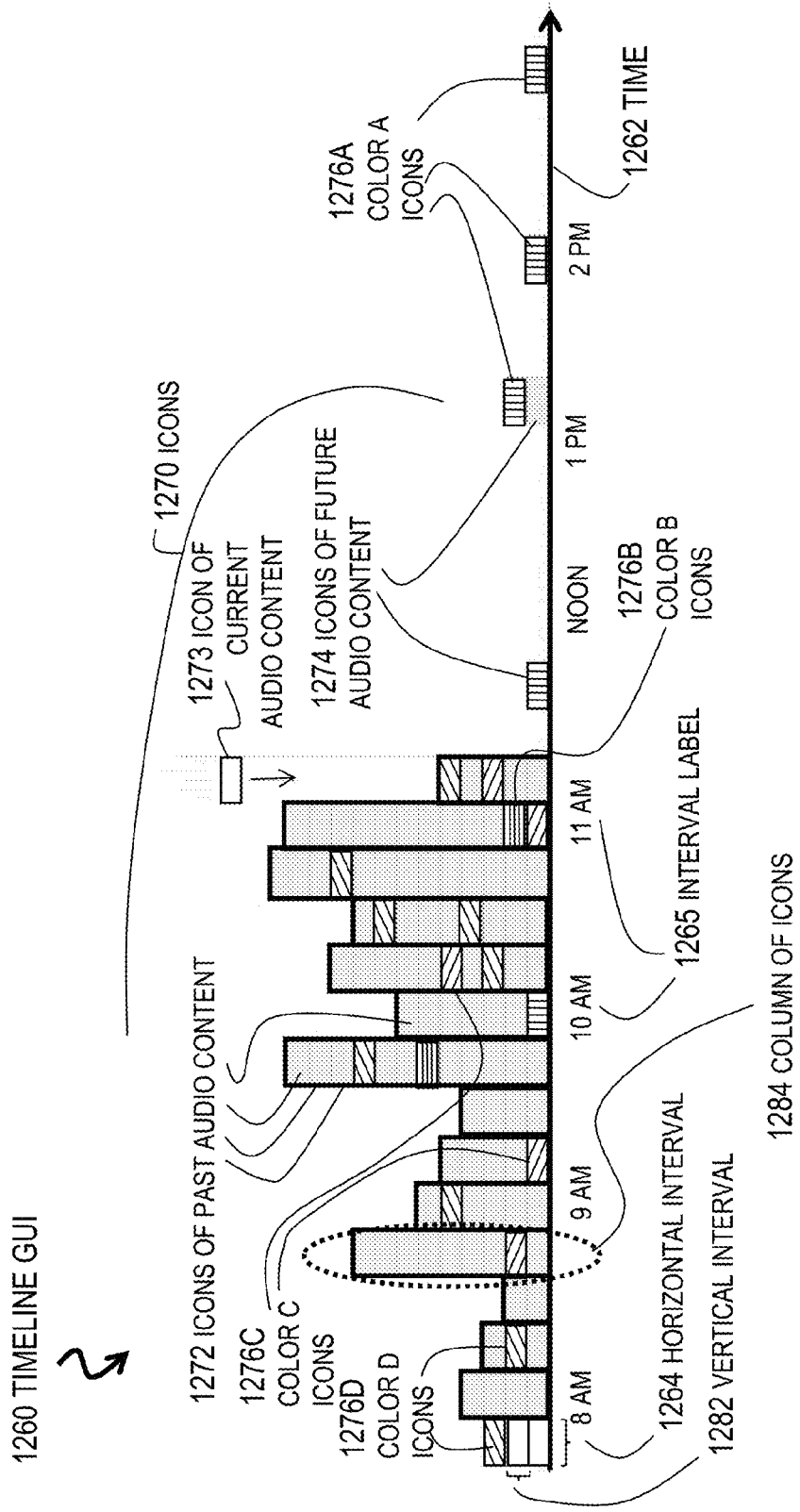
FIG. 12D is a diagram of a graphical user interface to control an audio channel, according to another embodiment.

FIG. 12D is a diagram of a graphical user interface 1260 to control an audio channel, according to another embodiment. Although the illustrated embodiment controls audio content for an audio channel, in other embodiments, the timeline GUI 1260 represents any content rendered by a user, including video, text, photos, games and/or other content.

The GUI 1160 includes a time axis 1262 with later time to the right of earlier time. The time axis is divided into horizontal intervals 1264; and some or all intervals are labeled with an interval label 1265. In the illustrated embodiment, each horizontal interval 1264 is the same length and represents the same temporal duration of one quarter hour (15 minutes). Intervals that begin on the hour are labeled with an interval label 1265 indicating the hour of the day.

Details of audio content within a horizontal interval 1264 are indicated by zero or more icons 1270. Multiple icons are stacked within an interval to form a column of icons, e.g., column 1284 of icons. To allow stacking, each icon has a limited vertical interval 1282. In the illustrated embodiment, the vertical interval 1282 of each icon is fixed. In some embodiments, the vertical interval represents any content no matter how large is the duration of the content within the quarter hour. In some embodiments, the vertical interval represents only audio content of duration up to a particular threshold duration, e.g., one minute in the illustrated embodiment. Audio content that persists longer than the threshold duration is represented by an additional icon for each additional threshold duration. More than 15 icons can be stacked if enough icons represent content that persists less than one minute, since each icon has a minimum height of the vertical interval 1282. In some embodiments, the icon representing audio content being rendered currently, e.g. at the current time, is indicated by an animated icon 1273 that drops onto the column of icons. The animated icon 1273 is also used in some embodiments as the current time icon. The icons 1272 of past audio content are positioned along time axis 1262 to the left of, or below, the icon 1273 of the current audio content. The icons 1274 of future/planned audio content are positioned along time axis 1262 to the right of the icon 1273 of the current audio content.

In the illustrated embodiment, each icon 1270 for audio content includes a uniform sized box. Audio content that is available as sound or transcript is indicated by a box with different colors indicating different types of audio. In the illustrated embodiment, uncolored icons represent content selected or reminders produced by the user, and colored icons represent special events or interactions with others. For example, color A (e.g., orange) icons 1276A indicate reminders provided by a friend of the user; color B (e.g., red) icons 1276B indicate text messages, such as TWITTER messages, from a friend; color C (e.g., green) icons 1276C indicate audio messages, such as a cellular telephone call with a friend; and color D (e.g., blue) icons 1276D indicate converted and indexed audio messages, such as snippets of a phone call that includes a website or other network or geographic address or phone number.

At least some pixels of each icon form an active area where pointer device actions or voice command, or some combination, are used to indicate operations on the content, such as play, convert to text, index, join, publish, or others described above.

As described above for timeline GUI 1220, timeline GUI 1260 represents all content delivered to a user on one audio channel defined and owned by that user. The user may choose to publish all or a part of the audio channel; and only the published portion is included as a timeline GUI presented to a friend of the user on a social network. A user may define multiple audio channels, e.g., for different themes, such as music, news, business, and a different timeline GUI is generated for each audio channel. A different portion of each may be published for use in the timeline GUI sent to a friend. A user may present multiple timelines of multiple friends, e.g., on the user's browser's home web page or a social network web page.

Figure 13A:
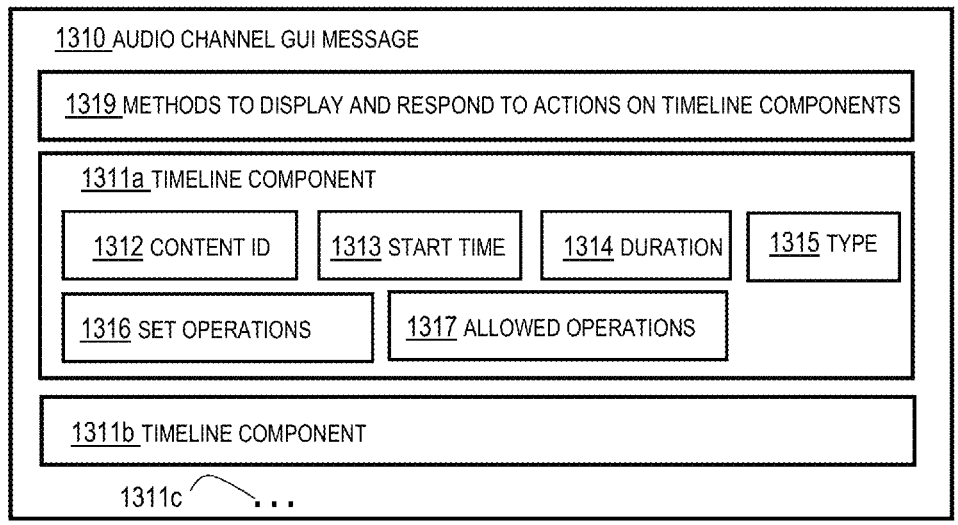
FIGS. 13A-13C are diagrams of messages associated with the graphical user interface, according to one embodiment.
Figure 13B:
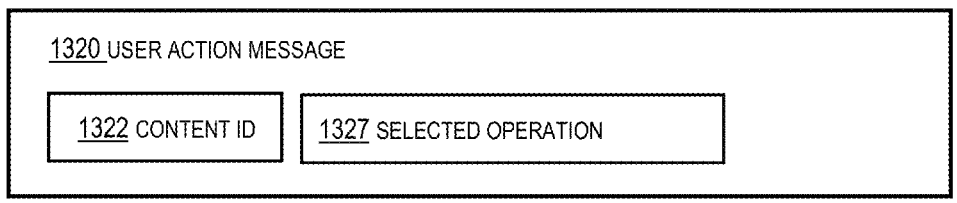
Figure 13C:
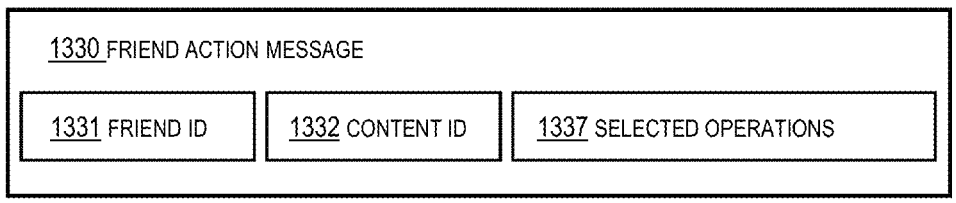

FIGS. 13A-13C are diagrams of messages associated with the graphical user interface, according to one embodiment. Although fields are depicted in FIGS. 13A-13C as contiguous blocks of data in a particular order in a single message of one or more data packets for purposes of illustration, in other embodiments, one or more fields or portions thereof, may be combined or separated or presented in a different order in one or more different data packets or messages.

FIG. 13A depicts an audio channel GUI message 1310 that includes a methods field 1319 that holds data that indicates instructions for displaying and responding to user actions for timeline components. Timeline component field 1311a includes a content identifier (ID) field 1312, a start time field 1313, a duration field 1314, a type field 1315, a field of set operations 1316, and a field of allowed operations 1317. A second timeline component field 1311b holds similar fields for a second timeline component; and ellipsis 1311c indicates timeline component fields for zero or more additional timeline components. Each timeline component represents a audio content on an audio channel.

The content ID field 1312 holds data that indicates a unique identification for the audio content represented by the timeline component. The start time field 1313 holds data that indicates the time the content started on the audio channel in the past, or is scheduled to start in the future. The duration field 1314 holds data that indicates the time after the start that the content ends on the audio channel. The type field 1315 holds data that indicates the type of content (e.g., telephone call, music, broadcast, alert, email converted to speech, etc.). This information is used to determine the icon, color or symbol to use to represent the content on the graphical user interface. The set operations field 1316 holds data that indicates the operations already performed on the audio content, such as the conversion of audio to text, or text to speech, indexing, publishing, etc.) This information is used to determine the symbol or relationship to use to represent the content on the graphical user interface. The allowed operations field 1317 holds data that indicates the operations that may still be performed on the audio content (such as the conversion of audio to text, or text to speech, indexing, publishing, etc.). This is used to determine what menu options, for example, to present to a user who positions a pointing device over the icon representing the audio content.

FIG. 13B depicts a user action message 1320 that indicates how a user has responded to the audio channel timeline GUI. The user action message includes a content ID field 1322 and a selected operation field 1327. The content ID field 1322 holds data that indicates a unique identification for the audio content represented by the timeline component, such as provided in field 1312 above. The selected operation field 1327 holds data that indicates the operation selected by the user (e.g., add content, convert to text, play audio, publish, etc.). In some embodiments, in which the user has defined several audio channels, the user action message 1320 includes data that indicates the channel on which the content identified in field 1322 appears.

FIG. 13C depicts a friend action message 1330 that indicates how a friend of the user in a social network has responded to the audio channel timeline GUI. The friend action message includes a friend identification (ID) field 1331, a content ID field 1332 and a selected operation field 1337. The friend ID field 1331 holds data that uniquely indicates the friend, e.g., by social network ID or other network address. The content ID field 1332 holds data that indicates a unique identification for the audio content represented by the timeline component, such as provided in field 1312 above. The selected operation field 1337 holds data that indicates the operation selected by the friend of the user (e.g., add content, convert to text, play audio, publish, join, etc.). In some embodiments, in which the user has defined several audio channels, the friend action message 1330 includes data that indicates the channel on which the content identified in field 1332 appears.

The processes described herein for providing network services at an audio interface unit may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 8 illustrates a computer system 800 upon which an embodiment of the invention may be implemented. Computer system 800 is programmed (e.g., via computer program code or instructions) to provide network services through an audio interface unit as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing network services through an audio interface unit.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing network services through an audio interface unit. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for at least some steps for providing network services through an audio interface unit. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for at least some steps for providing network services through an audio interface unit is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing network services directly to an audio interface unit 160 or indirectly through the UE 101.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server host 892 connected to the Internet hosts a process that provides a service in response to information received over the Internet. For example, server host 892 hosts a process that provides information representing video data for presentation at display 814.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set 900 upon which an embodiment of the invention may be implemented. Chip set 900 is programmed to provide network services through an audio interface unit as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of providing network services through an audio interface unit.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform one or more of the inventive steps described herein to provide network services through an audio interface unit The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of providing network services through an audio interface unit. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a base-band integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of configuring the server for the audio interface unit. The display unit 1007 includes display circuitry configured to display at least a portion of a user interface of the mobile terminal (e.g., mobile telephone). Additionally, the display unit 1007 and display circuitry are configured to facilitate user control of at least some functions of the mobile terminal An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to support providing network services through an audio interface unit The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    causing a reception of audio contents for audio presentation at a first device;
    causing a forming of a graphical user interface at the first device that displays the audio contents for user selection, and then displays the audio contents and available time durations as selected to be included in a time schedule of one or more user defined audio channels, wherein the selected audio contents are displayed as different graphic indicators according to different content sources for the audio contents;
    causing a presentation of the time schedule of the one or more user defined audio channels at a graphical user interface at a second device, wherein the time schedule includes a timeline specifying the selected time durations when the selected audio contents are available for a user of the second device to access from the timeline provided to the second device, wherein the timeline is a sequence of past and future audio contents depicted as a single line segment indicating a direction of advancing time; and
    in response to the presentation of the time schedule at the second device, causing a reception of data at the first device that indicates an associated operation on the time schedule, the one or more user defined audio channels, the selected one or more of the audio content, or a combination thereof, based on input from the user of the second device.

2. The method of claim 1, wherein:
    the first device is associated with a first user, and the second device is associated with a second user;
    the second user is associated with the first user on a social network service;
    the time schedule specifies that the second user to join the first user in accessing at least one of the selected audio contents in at least one of the user defined audio channels and
    the presentation of the graphical user interface includes the timeline to the second user through the social network service.

3. The method of claim 1, wherein the method further comprising:
    causing a reception of user selection of one or more of the user defined audio channels from the first device, the second device, or a combination thereof;
    converting text in the selected one or more of the user defined audio channels into sound; and
    initiating presentation of the selected one or more user defined audio channels including the sound at the first device, the second device, or a combination thereof,
    wherein each of the graphic indicators includes an audio amplitude trace, a relationship indication that depicts incoming from a source or out going to a destination, or a combination thereof.

4. The method of claim 3, further comprising:
    prioritizing presentation of content overlapping in time within one or more of the selected user defined audio channels.

5. The method of claim 1, wherein:
    the graphical user interface is presented via a browser of the second device; and
    the method further comprises causing an update of the one or more of the user defined audio channels and the graphical user interface at the first device based on a determination that the associated operation is complete.

6. The method of claim 1, wherein the one or more user defined audio channels presented at the second device is determined by a user of the first device to be shared with other users.

7. The method of claim 2, further comprising:
    causing one or more operations on the one or more audio contents selected to be included in the one or more user defined audio channels, wherein the one or more operations include: joining in listening to one or more contents of the plurality of audio contents; adding a future alert identifying a song; adding a future alert identifying a broadcast program; adding a future alert identifying an event; indexing text derived from the audio contents; searching text derived from the audio contents, or a combination thereof.

8. An apparatus comprising:
    at least one processor; and
    at least one memory including computer instructions, the at least one memory and computer instructions configured to, with the at least one processor, cause the apparatus at least to:
    cause a reception of audio contents for audio presentation at a first device;
    cause a forming of a graphical user interface at the first device that displays the audio contents for user selection, and then displays the audio contents and available time durations as selected to be included in a time schedule of one or more user defined audio channels, wherein the selected audio contents are displayed as different graphic indicators according to different content sources for the audio contents;
    cause a presentation of the time schedule of the one or more user defined audio channels at a graphical user interface at a second device,
    wherein the time schedule includes a timeline specifying the selected time durations when the selected audio contents are available for a user of the second device to access from the timeline provided to the second device, wherein the timeline is a sequence of past and future audio contents depicted as a single line segment indicating a direction of advancing time; and in response to the presentation of the time schedule at the second device, cause reception of data at the first device that an associated operation on the time schedule, the one or more user defined audio channels, the selected one or more of the audio content, or a combination thereof, based on input from the user of the second device.

9. The apparatus of claim 8, wherein:

the first device is associated with a first user, and the second device is associated with a second user;

the second user is associated with the first user on a social network service; and the presentation of the graphical user interface includes the timeline to the second user through the social network service.

10. The apparatus of claim 8, wherein the apparatus is further caused to:

cause a reception of user selection of one or more of the user defined audio channels from the first device, the second device, or a combination thereof;

convert text in the selected one or more of the user defined audio channels into sound; and initiate presentation of the selected one or more user defined audio channels including the sound at the first device, the second device, or a combination thereof.

11. The apparatus of claim 10, wherein the apparatus is further caused to:

prioritize presentation of content overlapping in time within one or more of the selected user defined audio channels.

12. The apparatus of claim 8, wherein:

the graphical user interface is presented via a browser of the second device; and the apparatus is further caused to, cause an update of the one or more of the user defined audio channels and the graphical user interface at the first device based on a determination that the associated operation is complete.

13. The apparatus of claim 12, wherein the one or more user defined audio channels presented at the second device is determined by a user of the first device to be shared with other users.

14. The apparatus of claim 8, wherein the apparatus is further caused to:

cause one or more operations on the one or more audio contents selected to be included in the one or more user defined audio channels, wherein the one or more operations include: joining in listening to one or more contents of the plurality of audio contents; adding a future alert identifying a song; adding a future alert identifying a broadcast program; adding a future alert identifying an event; indexing text derived from the audio contents; searching text derived from the audio contents, or a combination thereof.

15. A method comprising:

facilitating access to, including granting access rights for, a user interface configured to receive audio contents for audio presentation at a first device, and facilitating access by a second device to, including granting access rights for, a graphical user interface that displays audio contents and available time durations as selected by a user at the first device to be included in a time schedule of one or more user defined audio channels, wherein the selected audio contents are displayed as different graphic indicators according to different content sources for the audio contents, and the time schedule includes a timeline specifying the selected time durations when the selected audio contents are available for a user of the second device to access from the timeline provided to the second device, wherein the timeline is a sequence of past and future audio contents depicted as a single line segment indicating a direction of advancing time; and in response to the presentation of the time schedule at the second device, cause at least in part a reception of data at the first device that an associated operation on the time schedule, the one or more user defined audio channels, the selected one or more of the audio content, or a combination thereof, based on input from the user of the second device.

16. The method of claim 15, wherein the method further comprises causing presentation of one or more of the user defined audio channels at an audio interface unit of the second device.

17. The method of claim 16, wherein a second user of the second device is different from a first user of the first device and is associated with the first user on a social network service.

18. The method of claim 15, wherein:

the graphical user interface is presented via a browser of the second device; and the method further comprises causing presentation of the one or more of the audio contents at the browser of the second device.

19. The method of claim 15, further comprising:

causing one or more operations on the one or more audio contents selected to be included in the one or more user defined audio channels, wherein the one or more operations include: joining in listening to one or more contents of the plurality of audio contents; adding a future alert identifying a song; adding a future alert identifying a broadcast program; adding a future alert identifying an event; converting an audio file associated with the audio contents to text; indexing text derived from the audio contents; searching text derived from the audio contents, or a combination thereof.

20. The method of claim 15, wherein:

the presentation of the graphical user interface includes the timeline to the second user through the social network service.

* * * * *